United States Patent
Xu et al.

(10) Patent No.: US 12,445,963 B2
(45) Date of Patent: Oct. 14, 2025

(54) UE IDLE AND INACTIVE MODE ENHANCEMENT WITH SIDELINK

(71) Applicant: QUALCOMM Incorporated, San Diego, CA (US)

(72) Inventors: Huilin Xu, San Diego, CA (US); Fei Huang, San Diego, CA (US); Duo Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/149,982

(22) Filed: Jan. 15, 2021

(65) Prior Publication Data
US 2022/0232474 A1 Jul. 21, 2022

(51) Int. Cl.
*H04W 52/02* (2009.01)
*H04B 7/06* (2006.01)
(Continued)

(52) U.S. Cl.
CPC ...... *H04W 52/0229* (2013.01); *H04B 7/0626* (2013.01); *H04L 5/005* (2013.01);
(Continued)

(58) Field of Classification Search
CPC ... H04W 72/20; H04W 72/23; H04W 84/047; H04W 52/0229; H04W 52/383;
(Continued)

(56) References Cited

U.S. PATENT DOCUMENTS

2016/0249198 A1\* 8/2016 Kim ............... H04W 48/16
2019/0141692 A1\* 5/2019 Subramanian ....... H04L 5/0048
(Continued)

FOREIGN PATENT DOCUMENTS

WO   WO-2019029597 A1   2/2019

OTHER PUBLICATIONS

3GPP TSG RAN WG2 #97, Feb. 13-17, 2017, Discussion on the paging and system info acquisition of remote UE, R2-1701275 (Year: 2017).\*
(Continued)

*Primary Examiner* — Peter Chen
(74) *Attorney, Agent, or Firm* — Holland & Hart LLP

(57) ABSTRACT

Methods, systems, and devices for wireless communication are described. A connected mode UE may share reference signal configurations with an idle/inactive mode UE via a sidelink transmission. The connected mode UE may transmit a sidelink transmission including one or more reference signal configurations over a sidelink channel to an idle/inactive mode UE. The reference signal configuration may include reference signal resources that correspond to one or more beams that are tracked by the connected mode UE, such as an active downlink beam or beams adjacent to an active downlink beam. The idle/inactive mode UE may use the reference signal configuration to monitor for and receive one or more reference signals from the base station. In some examples, the connected mode UE may determine to transmit the sidelink transmission based on satisfaction of a trigger condition, such as a proximity of the idle/inactive mode UE to the connected mode UE.

19 Claims, 12 Drawing Sheets

(51) Int. Cl.

| | |
|---|---|
| *H04L 5/00* | (2006.01) |
| *H04W 4/02* | (2018.01) |
| *H04W 52/24* | (2009.01) |
| *H04W 52/52* | (2009.01) |
| *H04W 72/20* | (2023.01) |
| *H04W 76/27* | (2018.01) |
| *H04W 76/28* | (2018.01) |
| *H04W 92/18* | (2009.01) |

(52) U.S. Cl.
CPC ......... *H04W 4/023* (2013.01); *H04W 52/242* (2013.01); *H04W 52/52* (2013.01); *H04W 72/20* (2023.01); *H04W 76/27* (2018.02); *H04W 76/28* (2018.02); *H04W 92/18* (2013.01)

(58) Field of Classification Search
CPC ..... H04W 52/242; H04W 52/52; H04W 4/44; H04W 4/46; H04W 92/18; H04W 88/04; H04W 48/16; H04W 76/27; H04W 76/28; H04L 5/0023; H04L 5/0048; H04L 5/0051

See application file for complete search history.

(56) References Cited

U.S. PATENT DOCUMENTS

| | | | | |
|---|---|---|---|---|
| 2020/0313825 | A1* | 10/2020 | Ryu | H04W 72/20 |
| 2020/0359434 | A1* | 11/2020 | Raghavan | H04B 7/088 |
| 2020/0396633 | A1 | 12/2020 | Tseng et al. | |

OTHER PUBLICATIONS

Ericsson: "Handling of SL in Uu RRC State Transitions", 3GPP Draft, 3GPP TSG-RAN WG2 #108, R2-1915383, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 7, 2019 (Nov. 7, 2019), XP051815898, 3 Pages, Retrieved from the Internet: URL: https://ftp.3gpp.org/tsg_ran/WG2_RL2/TSGR2_108/Docs/R2-1915383.zip R2-1915383—Handling of SL in Uu RRC State Transitions.docx [Retrieved on Nov. 7, 2019] paragraph [0001]-paragraph [0002].

International Search Report and Written Opinion—PCT/US2021/061407—ISA/EPO—Mar. 29, 2022 (2100838WO).

ZTE: "Consideration on System Information Acquisition", 3GPP Draft, 3GPP TSG-RAN WG2#108, R2-1914541, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051816607, 3 Pages, Retrieved from the Internet: URL: https://ftp.3gpp.org/tsg_ran/WG2_RL2/TSGR2_108/Docs/R2-1914541.zip R2-1914541 Consideration on System Information Acquisition.doc [Retrieved on Nov. 8, 2019] System Info/Change Receprion in V2X-sidelink, Paragraph [0001]-Paragraph [0002].

ZTE: "Discussion on the Paging and System Info Acquisition of Remote Ue", 3GPP Draft, 3GPP TSG RAN WG2 #97, R2-1701275, Discussion on the Paging and System Info Acquisition of Evolved Remote UE, 3rd Generation Partnership Project (3GPP), Mobile Competence Centre, 650, Route Des Lucioles, F-06921 Sop, vol. RAN WG2 , No. Athens, Greece, Feb. 13, 2017-Feb. 17, 2017, Feb. 12, 2017 (Feb. 12, 2017) , XP051211941, 5 Pages, Retrieved from the Internet: URL: http://www.3gpp.org/ftp/Meetings_3GPP_SYNC/RAN2/Docs/ [Retrieved on Feb. 12, 2017] Paragraph [02.2].

* cited by examiner

UE IDLE AND INACTIVE MODE ENHANCEMENT WITH SIDELINK

FIELD OF TECHNOLOGY

The following relates to wireless communication, including UE idle and inactive mode enhancement with sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may operate in a low power mode, such as an idle or inactive mode. An inactive or idle mode UE may be configured to periodically wake up to receive a reference signal (e.g., a synchronization signal block (SSB)) to be used for tracking, synchronization, channel estimation, or other operations. However, the reference signal may be transmitted with a low periodicity and/or in a limited bandwidth. The UE may therefore wake up repeatedly to receive a number of reference signals during reference signal occasions, which may increase power consumption and reduce efficiency at the UE.

SUMMARY

The described techniques relate to improved methods, systems, devices, and apparatuses that support UE idle and inactive mode enhancement with sidelink. Generally, the described techniques enable a UE operating in an idle mode or an inactive mode to be provided with additional reference signal configurations using sidelink communications. A connected mode UE may determine to share a reference signal configuration with the idle/inactive mode UE via a sidelink transmission. In some examples, the idle/inactive mode UE may transmit a request for a reference signal configuration. The reference signal configuration may include reference signal resources that correspond to one or more beams that are tracked by the connected mode UE, such as an active downlink beam or beams adjacent to an active downlink beam. The idle/inactive mode UE may use the reference signal configuration to monitor for and receive one or more reference signals from the base station. In some examples, the connected mode UE may determine to transmit the sidelink transmission based on satisfaction of a trigger condition, such as a proximity of the idle/inactive mode UE to the connected mode UE. Additionally, or alternatively, the idle/inactive mode UE may prioritize received reference signal configurations or resources based on the proximity.

A method for wireless communication at a first UE is described. The method may include receiving, from a second UE and over a sidelink channel, a sidelink transmission that includes a reference signal configuration for receiving one or more reference signals from a base station, monitoring for the one or more reference signals based on the reference signal configuration received from the second UE, and receiving at least one reference signal from the base station based on the monitoring.

An apparatus for wireless communication at a first UE is described. The apparatus may include a processor, memory in electronic communication with the processor, and instructions stored in the memory. The instructions may be executable by the processor to cause the apparatus to receive, from a second UE and over a sidelink channel, a sidelink transmission that includes a reference signal configuration for receiving one or more reference signals from a base station, monitor for the one or more reference signals based on the reference signal configuration received from the second UE, and receive at least one reference signal from the base station based on the monitoring.

Another apparatus for wireless communication at a first UE is described. The apparatus may include means for receiving, from a second UE and over a sidelink channel, a sidelink transmission that includes a reference signal configuration for receiving one or more reference signals from a base station, means for monitoring for the one or more reference signals based on the reference signal configuration received from the second UE, and means for receiving at least one reference signal from the base station based on the monitoring.

A non-transitory computer-readable medium storing code for wireless communication at a first UE is described. The code may include instructions executable by a processor to receive, from a second UE and over a sidelink channel, a sidelink transmission that includes a reference signal configuration for receiving one or more reference signals from a base station, monitor for the one or more reference signals based on the reference signal configuration received from the second UE, and receive at least one reference signal from the base station based on the monitoring.

In some examples of the method, apparatuses, and non-transitory computer-readable medium described herein, receiving the sidelink transmission that includes the reference signal configuration may include operations, features, means, or instructions for receiving reference signal resources that correspond with an active downlink beam tracked by the second UE.

In some examples of the method, apparatuses, and non-transitory computer-readable medium described herein, receiving the sidelink transmission that includes the reference signal configuration may include operations, features, means, or instructions for receiving reference signal resources that correspond with an active downlink beam tracked by the second UE and with one or more beams adjacent to the active downlink beam.

In some examples of the method, apparatuses, and non-transitory computer-readable medium described herein, receiving the sidelink transmission that includes the reference signal configuration may include operations, features, means, or instructions for receiving all reference signal resources configured to the second UE.

In some examples of the method, apparatuses, and non-transitory computer-readable medium described herein, receiving the sidelink transmission that includes the reference signal configuration may include operations, features, means, or instructions for receiving a set of multiple reference signal resources configured to the second UE in an ordered list in accordance with an order, where individual reference signal resources of the set of multiple reference signal resources each correspond to a beam tracked by the second UE, and where the order may be based on proximity of respective beams to an active downlink beam tracked by the second UE.

In some examples of the method, apparatuses, and non-transitory computer-readable medium described herein, receiving the sidelink transmission that includes the reference signal configuration may include operations, features, means, or instructions for receiving, as part of the sidelink transmission, an indication of a transmit power used by the second UE for transmitting the sidelink transmission, physical positioning information of the second UE, zone information of the second UE, or some combination thereof.

Some examples of the method, apparatuses, and non-transitory computer-readable medium described herein may further include operations, features, means, or instructions for determining a proximity of the first UE to the second UE based on a determined path loss derived from the transmit power, the physical positioning information of the second UE, the zone information of the second UE, or some combination thereof and using the reference signal configuration for monitoring for the one or more reference signals based on the proximity of the first UE to the second UE.

In some examples of the method, apparatuses, and non-transitory computer-readable medium described herein, receiving the sidelink transmission that includes the reference signal configuration may include operations, features, means, or instructions for receiving a set of multiple sidelink transmissions from the set of multiple UEs, each of the set of multiple sidelink transmissions including respective reference signal configurations for receiving the one or more reference signals from the base station.

Some examples of the method, apparatuses, and non-transitory computer-readable medium described herein may further include operations, features, means, or instructions for selecting the reference signal configuration from the set of multiple sidelink transmissions based on a proximity of the first UE with each of the set of multiple UEs.

Some examples of the method, apparatuses, and non-transitory computer-readable medium described herein may further include operations, features, means, or instructions for transmitting a reference signal configuration request message, where the sidelink transmission may be received based on the reference signal configuration request message.

In some examples of the method, apparatuses, and non-transitory computer-readable medium described herein, transmitting the reference signal configuration request message may include operations, features, means, or instructions for transmitting, as part of the reference signal configuration request message, an indication of a transmit power of the reference signal configuration request message, physical positioning information of the first UE, zone information of the first UE, or some combination thereof.

In some examples of the method, apparatuses, and non-transitory computer-readable medium described herein, transmitting the reference signal configuration request message may include operations, features, means, or instructions for transmitting the reference signal configuration request message as one of a unicast transmission, a broadcast transmission, or a groupcast transmission.

In some examples of the method, apparatuses, and non-transitory computer-readable medium described herein, the at least one reference signal includes a channel state information reference signal (CSI-RS) and the method, apparatuses, and non-transitory computer-readable medium may include further operations, features, means, or instructions for using the channel state information (CSI)-RS for one or more of downlink channel estimation, timing and frequency tracking updating, automatic gain control (AGC) loop updating, or serving cell radio resource management (RRM) measurement.

In some examples of the method, apparatuses, and non-transitory computer-readable medium described herein, the at least one reference signal includes a positioning reference signal (PRS) and the method, apparatuses, and non-transitory computer-readable medium may include further operations, features, means, or instructions for using the PRS for downlink-based positioning.

In some examples of the method, apparatuses, and non-transitory computer-readable medium described herein, receiving the sidelink transmission that includes the reference signal configuration may include operations, features, means, or instructions for receiving the sidelink transmission over the sidelink channel via one of a unicast transmission, a groupcast transmission, or a broadcast transmission.

In some examples of the method, apparatuses, and non-transitory computer-readable medium described herein, the first UE may be in a radio resource control (RRC) idle mode or an inactive mode.

A method for wireless communication at a first UE is described. The method may include identifying a reference signal configuration that is active at the first UE for receiving one or more reference signals from a base station, determining to transmit the reference signal configuration over a sidelink channel based on satisfaction of a trigger condition, and transmitting the reference signal configuration via a sidelink transmission over the sidelink channel to a second UE based on the trigger condition being satisfied.

An apparatus for wireless communication at a first UE is described. The apparatus may include a processor, memory in electronic communication with the processor, and instructions stored in the memory. The instructions may be executable by the processor to cause the apparatus to identify a reference signal configuration that is active at the first UE for receiving one or more reference signals from a base station, determine to transmit the reference signal configuration over a sidelink channel based on satisfaction of a trigger condition, and transmit the reference signal configuration via a sidelink transmission over the sidelink channel to a second UE based on the trigger condition being satisfied.

Another apparatus for wireless communication at a first UE is described. The apparatus may include means for identifying a reference signal configuration that is active at the first UE for receiving one or more reference signals from a base station, means for determining to transmit the reference signal configuration over a sidelink channel based on satisfaction of a trigger condition, and means for transmitting the reference signal configuration via a sidelink transmission over the sidelink channel to a second UE based on the trigger condition being satisfied.

A non-transitory computer-readable medium storing code for wireless communication at a first UE is described. The code may include instructions executable by a processor to identify a reference signal configuration that is active at the first UE for receiving one or more reference signals from a base station, determine to transmit the reference signal configuration over a sidelink channel based on satisfaction of a trigger condition, and transmit the reference signal configuration via a sidelink transmission over the sidelink channel to a second UE based on the trigger condition being satisfied.

In some examples of the method, apparatuses, and non-transitory computer-readable medium described herein, transmitting the reference signal configuration may include operations, features, means, or instructions for transmitting reference signal resources that correspond with an active downlink beam tracked by the first UE.

In some examples of the method, apparatuses, and non-transitory computer-readable medium described herein, transmitting the reference signal configuration may include operations, features, means, or instructions for transmitting reference signal resources that correspond with an active downlink beam tracked by the first UE and with one or more beams adjacent to the active downlink beam.

In some examples of the method, apparatuses, and non-transitory computer-readable medium described herein, transmitting the reference signal configuration may include operations, features, means, or instructions for transmitting all reference signal resources configured to the first UE.

In some examples of the method, apparatuses, and non-transitory computer-readable medium described herein, transmitting the reference signal configuration may include operations, features, means, or instructions for transmitting a set of multiple reference signal resources configured to the first UE in an ordered list in accordance with an order, where individual reference signal resources of the set of multiple reference signal resources each correspond to a beam tracked by the first UE, and where the order may be based on proximity of respective beams to an active downlink beam tracked by the first UE.

In some examples of the method, apparatuses, and non-transitory computer-readable medium described herein, the sidelink transmission includes an indication of a transmit power of the sidelink transmission, physical positioning information of the first UE, zone information of the first UE, or some combination thereof.

Some examples of the method, apparatuses, and non-transitory computer-readable medium described herein may further include operations, features, means, or instructions for receiving, from the second UE, a reference signal configuration request message, where the sidelink transmission may be transmitted based on the reference signal configuration request message.

Some examples of the method, apparatuses, and non-transitory computer-readable medium described herein may further include operations, features, means, or instructions for receiving, as part of the reference signal configuration request message, an indication of a transmit power used by the second UE to transmit the reference signal configuration request message, physical positioning information of the second UE, zone information of the second UE, or some combination thereof, determining a proximity of the first UE to the second UE based on a determined path loss derived from the transmit power, the physical positioning information of the second UE, the zone information of the second UE, or some combination thereof, and determining whether the trigger condition may be satisfied based on the proximity.

Some examples of the method, apparatuses, and non-transitory computer-readable medium described herein may further include operations, features, means, or instructions for selecting between a narrow beam reference signal configuration and a wide beam reference signal configuration based on the proximity.

In some examples of the method, apparatuses, and non-transitory computer-readable medium described herein, the one or more reference signals include a CSI-RS or a PRS.

In some examples of the method, apparatuses, and non-transitory computer-readable medium described herein, the sidelink transmission may be transmitted as a unicast transmission, a broadcast transmission, or a groupcast transmission.

In some examples of the method, apparatuses, and non-transitory computer-readable medium described herein, the first UE may be in a connected mode.

DETAILED DESCRIPTION

Figure 1:
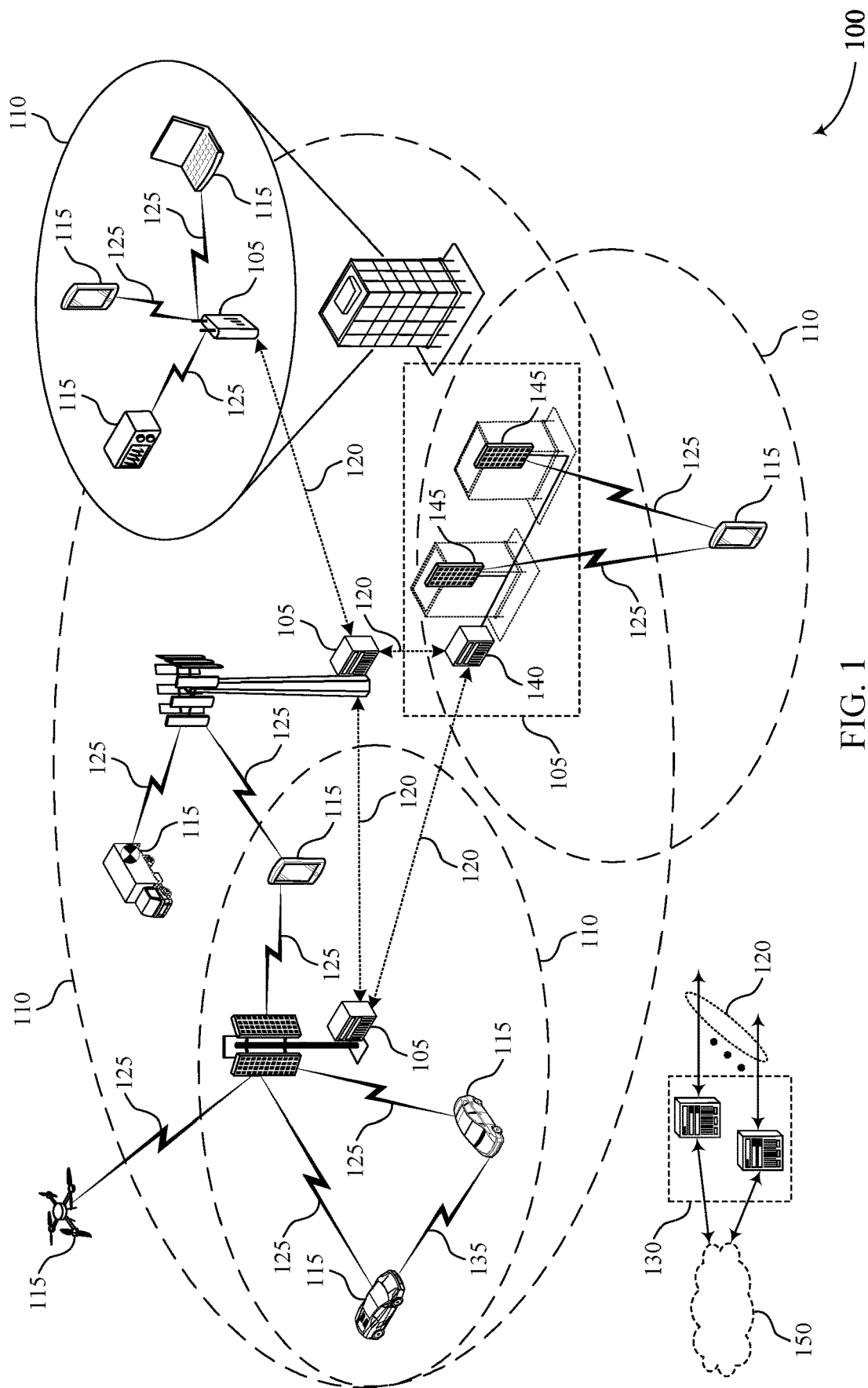
FIG. 1 illustrates an example of a wireless communications system that supports UE idle and inactive mode enhancement with sidelink in accordance with aspects of the present disclosure.

Some wireless communications systems may support an inactive mode and/or an idle mode for user equipment (UE). A UE may operate in an idle or inactive mode, for example, to conserve battery and reduce power consumption. While in idle or inactive mode, the UE may spend less time monitoring for signaling from a base station and may spend a majority of time in sleep, but may periodically wake up to monitor for a paging message. Additionally, the UE may periodically wake up to monitor for and receive a reference signal, such as a synchronization signal block (SSB), and may use the SSB to measure one or more channel parameters for receiving the paging message. For instance, the UE may perform tracking, synchronization, or other operations. However, SSBs may be transmitted with a relatively low periodicity, a low transmit power, or a narrow bandwidth. Accordingly, the idle/inactive mode UE may not be able to perform such reference signal operations without receiving several SSBs, and other factors (e.g., poor channel conditions) may further increase the number of SSBs received by the UE before the UE is able to receive the paging message. The UE may therefore suffer increased power consumption as the number of SSBs increases, as the UE must be awake for each SSB occasion. Further, the UE may experience decreased efficiency and may be unable to receive paging messages quickly, as increasing the number of SSBs increases the duration spent to obtain sufficient information.

In some examples, the idle/inactive mode UE may obtain other reference signals (e.g., different from an SSB) to use in determining channel parameters, but the other reference signals may not be configured for the idle/inactive mode UE. For instance, the reference signal may be configured for a connected mode UE and may correspond to a relatively narrow beam. The idle/inactive mode UE may therefore consume additional power tracking the narrow beam. Additionally, the narrow beam may not be accessible to the idle/inactive mode UE, e.g., if the idle/inactive mode UE is geographically far from the connected mode UE.

Providing idle/inactive mode UEs with additional reference signal configurations may reduce power consumption and inefficiency associated with performing tracking and synchronization while in idle/inactive modes. While a UE operating in an idle/inactive mode may not have an active connection with a base station, the UE may still maintain one or more sidelink connections with other UEs. Thus, a UE with an active connection to a base station (e.g., a UE operating in a connected mode) may share an active reference signal configuration with a nearby idle/inactive mode UE via a sidelink transmission. In some cases, the idle/inactive mode UE may transmit a message requesting that the connected mode UE share a reference signal configuration. The idle/inactive mode UE may use the reference signal configuration to monitor for and receive one or more reference signals (e.g., channel state information reference signals (CSI-RSs), positioning reference signals (PRSs), tracking reference signals (TRSs), etc.) from a base station. The reference signal configuration may include resources for one or more beams tracked by the connected mode UE. For instance, the reference signal configuration may include reference signal resources that correspond with an active downlink beam, as well as reference signal resources that correspond with one or more beams adjacent to the active downlink beam. The idle/inactive mode UE may therefore reduce an overall wake-up time by receiving reference signals more frequently (as compared to only receiving SSBs), which may in turn reduce power consumption at the idle/inactive mode UE. Additionally, receiving reference signals more frequently may reduce the duration needed by the idle/inactive mode UE to obtain the channel parameters for receiving a paging message.

In some examples, the connected mode UE may transmit the reference signal configuration to multiple other idle/inactive mode UEs. Similarly, the idle/inactive mode UE may receive reference signal configurations from multiple other connected mode UEs. The idle/inactive mode UE and the connected mode UE may therefore also share location information and/or transmit power information (e.g., for the sidelink transmission transmitted by the connected mode UE and/or the request message transmitted by the idle/inactive mode UE) such that each UE may determine their proximity to one another. The connected mode UE may use the proximity to determine whether to transmit a reference signal configuration to the idle/inactive mode UE. For example, the connected mode UE may refrain from sharing a reference signal configuration for a narrow beam reference signal if the idle/inactive mode UE is too far away (e.g., if the narrow beam would be inaccessible to the idle/inactive mode UE). The idle/inactive mode UE may prioritize reference signal configurations received from connected mode UEs that are closer in proximity.

Aspects of the disclosure are initially described in the context of wireless communications systems. Aspects of the disclosure are then described with reference to a transmission diagram and a process flow. Aspects of the disclosure are further illustrated by and described with reference to apparatus diagrams, system diagrams, and flowcharts that relate to UE idle and inactive mode enhancement with sidelink.

FIG. 1 illustrates an example of a wireless communications system 100 that supports UE idle and inactive mode enhancement with sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)).

Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support a UE 115 operating in an idle or inactive mode. For example, when a UE 115 does not have much traffic from serving cells, the UE 115 may enter an inactive or idle mode to conserve battery and improve power savings. When the UE 115 is in the inactive mode, the last-serving base station 105 may maintain access-stratum context for the UE 115, which may have been established by an RRC connection. When the UE 115 is in the idle mode, the network may discard the UE context.

When the UE 115 is operating in the inactive mode or the idle mode, the UE 115 may spend less time monitoring for signaling, thereby reducing power consumption. While operating in the inactive mode or idle mode, the UE 115 may sleep for most of a discontinuous reception (DRX) cycle and periodically wake up to monitor for a paging message. In some cases, the UE 115 may monitor for one paging occasion per DRX cycle. Each paging occasion may include a set of physical downlink control channel (PDCCH) monitoring occasions and may include multiple time slots (e.g., multiple subframes or multiple OFDM symbols) where paging downlink control information (DCI) may be sent. The UE 115 may attempt to decode signals using a paging radio network temporary identifier (P-RNTI) to check for messages indicating pending data. If the UE 115 does not detect a paging message indicating presence of data or a call, the UE 115 may go back to sleep until the next paging occasion.

The techniques described herein support providing a UE 115 in an inactive mode or an idle mode with additional reference signals such as TRSs, PRSs, and CSI-RSs. A UE 115 in idle/inactive mode may receive, from a UE 115 in connected mode, a sidelink transmission including a reference signal configuration. The sidelink transmission may be transmitted by the connected mode UE 115 and received by the idle/inactive mode UE 115 over a sidelink channel as a unicast transmission, a groupcast transmission, or a broadcast transmission. The reference signal configuration may include resources for one or more beams tracked by the connected mode UE 115. The idle/inactive mode UE 115 may monitor for and receive one or more reference signals from a base station 105 based on the reference signal configuration. In some examples, the idle/inactive mode UE 115 may use the received reference signal(s) to perform one or more operations. For instance, if the received reference signal is a CSI-RS, the idle/inactive mode UE 115 may perform downlink channel estimation, timing and frequency tracking loop updating, automatic gain control (AGC) loop updating, serving cell radio resource management (RRM) measurement, or some combination thereof. If the received reference signal is a PRS, the idle/inactive mode UE 115 may use the PRS for downlink-based positioning.

In some examples, the idle/inactive mode UE 115 may receive sidelink transmissions including reference signal configurations from multiple connected mode UEs 115. Thus, in such examples, each connected mode UE 115 may include, as part of the sidelink transmission, information that may enable the idle/inactive mode UE 115 to derive a proximity to the corresponding connected mode UE 115. The idle/inactive mode UE 115 may prioritize reference signal configurations received from connected mode UEs 115 that are closer in proximity to the idle/inactive mode UE 115.

In some cases, the idle/inactive mode UE 115 may transmit a request for a reference signal configuration, for example, as a unicast transmission, a broadcast transmission, or a groupcast transmission. The idle/inactive mode UE 115 may include, as part of the request, information that may enable a receiving connected mode UE 115 to derive a proximity to the idle/inactive mode UE 115. Based on the proximity, the connected mode UE 115 may selectively transmit, to the idle/inactive mode UE 115 in response to the request message, a sidelink transmission including a reference signal configuration. For example, if the connected mode UE 115 is too far away from the idle/inactive mode UE 115, the connected mode UE 115 may determine to refrain from transmitting a reference signal configuration or may determine to transmit a wide beam reference signal configuration (e.g., instead of a narrow beam reference signal configuration, which may not be accessible or useful to the idle/inactive mode UE 115).

Figure 2:
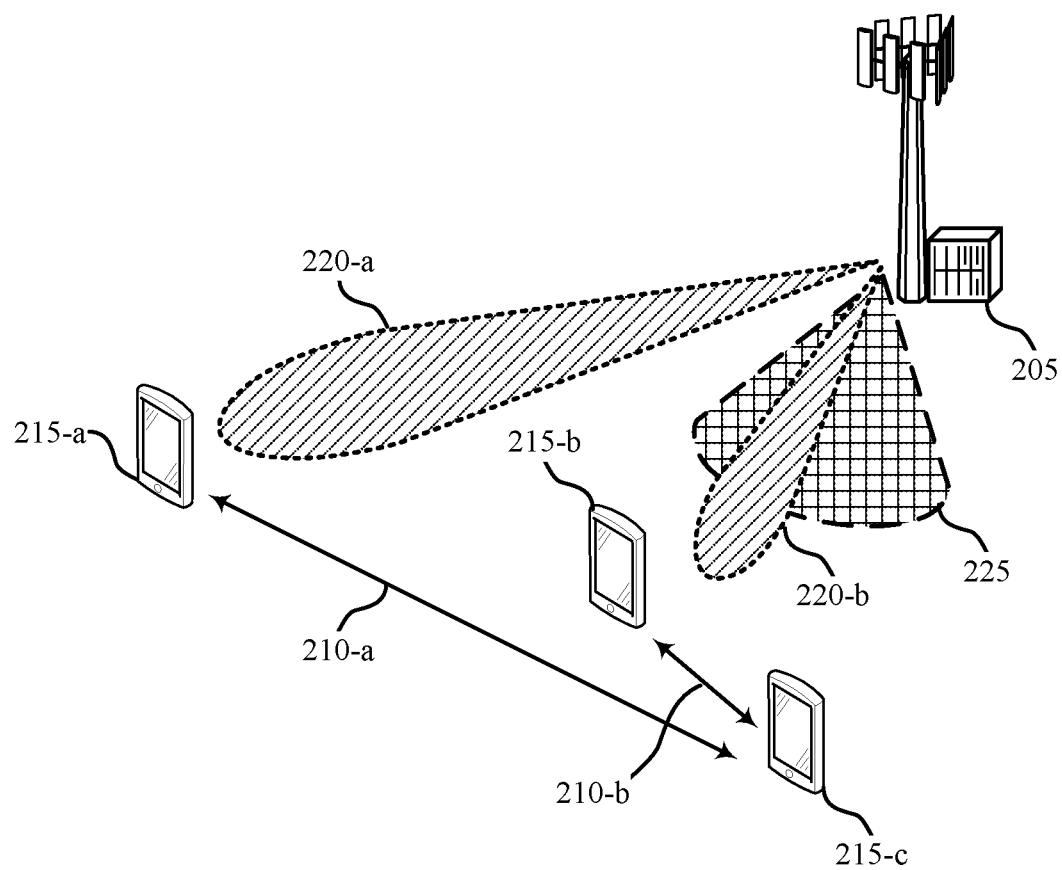
FIG. 2 illustrates an example of a wireless communications system that supports UE idle and inactive mode enhancement with sidelink in accordance with aspects of the present disclosure.

FIG. 2 illustrates an example of a wireless communications system 200 that supports UE idle and inactive mode enhancement with sidelink in accordance with aspects of the present disclosure. In some examples, the wireless communications system 200 may implement aspects of wireless communication system 100. The wireless communications system 200 may include UEs 215-a, 215-b, and 215-c, and a base station 205, which may be respective examples of a UE 115 and a base station 105 described with reference to FIG. 1. UEs 215-a and 215-b may communicate with 215-c via sidelinks 210-a and 210-b, respectively.

UEs 215 operating in wireless communications system 200 may operate in one of a connected mode, an idle mode, or an inactive mode. For instance, if a UE 215, such as UE 215-c, has limited traffic from serving cells, UE 215-c may enter a low power mode to conserve battery and improve power savings. For example, UE 215-c may enter an inactive mode or an idle mode. When UE 215-c is in the inactive mode, base station 205 may maintain the UE context established by an RRC connection. When UE 215-c is in the idle mode, base station 205 may discard the UE context. In some examples, UE 215-c may be in an idle/inactive mode based on a UE type. For instance, UE 215-c may be a sensing device or a reduced capability (REDCAP) UE and may not be configured to transmit or receive, and may therefore operate in idle/inactive mode for extensive periods of time. Alternatively, UEs 215-a and 215-b may operate in a connected mode, where UE 215-a and UE 215-b each have an active RRC connection with base station 205.

When UEs 215-a and 215-b are operating in an active or connected mode, base station 205 may manage some radio resource management operations for UEs 215-a and 215-b based on UE mobility, radio channel quality, or both. In some cases, base station 205 may configure UEs 215-a and 215-b with one or more reference signal configurations so that UEs 215-a and 215-b may receive reference signals (e.g., reference signals 220-a and 220-b, respectively) from base station 205. For example, a reference signal configuration may include time resources, frequency resources, spatial resources, or some combination thereof, that may be used by UEs 215-a and 215-b to receive a reference signal 220. Reference signals 220 may be a TRS, a CSI-RS, or a PRS, among other examples. For instance, base station 205 may transmit a TRS to UEs 215-a and 215-b, which may be used to track the downlink trimming and frequency of UEs 215-a and 215-b within the wireless communications system 200. To measure channel conditions for UEs 215-a and 215-b, base station 205 may transmit a CSI-RS. UEs 215-a and 215-b may measure the CSI-RS and provide a CSI report to the base station 205 indicating various radio channel quality measurements. Additionally or alternatively, base station 205 may transmit a PRS to UEs 215-a and 215-b to determine positioning of the UEs 215-a and 215-b.

When UE 215-c is operating in the inactive mode or the idle mode, UE 215-c may spend less time monitoring for signaling from base station 205, thereby reducing power consumption. While operating in the inactive mode or idle mode, UE 215-c may sleep for most of a DRX cycle and periodically wake up to monitor for a paging message or an SSB 225. For example, UE 215-c may wake up for an SSB occasion to receive an SSB 225, which UE 215-c may use to perform tracking and/or synchronization (e.g., to find a downlink channel). However, SSB occasions may have a relatively low periodicity (e.g., 20 milliseconds (ms)) and may be transmitted on a relatively narrow bandwidth and with a low transmit power. Thus, UE 215-c may not be able to perform tracking and synchronization by receiving one SSB occasion. That is, the UE 215-c may need to receive multiple SSB occasions to obtain enough signal energy to perform tracking and synchronization. Due to the low periodicity of the SSB occasions, UE 215-c may therefore not be able to perform tracking and synchronization in a short time frame. For instance, in the example of FIG. 2, UE 215-c may be far from base station 205 and SSB 225 may be transmitted with a relatively low transmit power. UE 215-c may therefore wake up for multiple SSB occasions. If, for example, each SSB occasion is transmitted with a periodicity of 20 ms and UE 215-c wakes up for three SSB occasions, the UE 215-c may not perform tracking and synchronization until 60 ms have passed. Additionally, poor channel conditions (e.g., a low signal-to-interference-plus-noise ratio (SINR), a low signal-to-noise ratio (SNR), etc.) may further increase the number of SSB occasions needed by UE 215-c and, consequentially, the number of wake-up instances. As each wake-up instance consumes power, increasing the number of wake-up instances also increases the power consumption of the UE 215-c.

To reduce the number of wake-up instances, and therefore the power consumption of the UE 215-c, base station 205 may share a reference signal configuration for a connected mode UE 215 (e.g., UE 215-a, UE 215-b) with an idle/inactive mode UE 215 (e.g., UE 215-c), so that the idle/inactive mode UE 215 may receive one or more additional reference signals (e.g., other than an SSB). However, because the reference signal configuration shared by base station 205 is not dedicated for the UE 215-c, UE 215-c may not be able to efficiently detect the additional reference signal. For example, the transmitted reference signal may be narrow or may be transmitted with a relatively low power, and the UE 215-c may consume additional power attempting to track the reference signal. In some cases, the UE 215-c may not be able to access the reference signal at all; in the example of FIG. 2, for instance, the reference signal configuration may be for reference signal 220-a, which may be inaccessible to UE 215-c. Further, in some examples, the reference signal configuration may not be recent (e.g., may have been updated since UE 215-c received the configuration, and because UE 215-c is in idle/inactive mode, UE 215-c may be unaware of the update) and UE 215-c may not be able to receive the reference signal. Thus, a base station 205 sharing a reference signal configuration with UE 215-c may not yield significant power savings (e.g., as compared to UE 215-c only receiving SSBs) and, in some cases, may worsen power consumption. Additionally, base station 205 may selectively choose to share the reference signal configuration with UE 215-c (e.g., may choose to refrain from sharing the reference signal configuration), in which case UE 215-c may continue to receive only SSB 225 and may continue to suffer the associated increased power consumption.

While a UE 215 (e.g., UE 215-c) operating in idle/inactive mode may not have an active connection with a base station 205, the UE 215 may be able to communicate with other UEs 215 in the wireless communication system 200 via sidelinks 210 (e.g., by performing a sidelink discovery procedure to establish sidelink communications). Thus, as described herein, to reduce wake-up instances and corresponding power consumption, a UE 215 (e.g., UE 215-c) operating in idle/inactive mode may receive a reference signal configuration from a connected mode UE (e.g., UEs 215-a and 215-b) via a sidelink transmission over a sidelink channel. If the idle/inactive mode UE 215 and the connected mode UE 215 are geographically close to each other, the reference signal configuration may enable the idle/inactive mode UE 215 to receive a reference signal from a base station. For example, UE 215-b may be configured with a reference signal configuration used to receive one or more reference signals, including reference signal 220-b, from base station 205. UE 215-b may transmit, via sidelink 210-b, a sidelink transmission including the reference signal configuration to UE 215-c. The reference signal configuration may include resources (e.g., time resources, frequency resources, spatial resources, etc.) corresponding with one or more downlink beams tracked by UE 215-b. Because UE 215-c is in close proximity to UE 215-b, the downlink beams tracked by UE 215-b may be accessible to UE 215-c. That is, UE 215-c may use the reference signal configuration to monitor for and receive one or more reference signals (e.g., reference signal 220-b) from the base station 205.

A UE 215 (e.g., UEs 215-a and 215-b) operating in a connected mode may determine whether to share a reference signal configuration with a UE 215 (e.g., UE 215-c) operating in idle/inactive mode based on a trigger condition being satisfied. The trigger condition may include, but is not limited to, a proximity of the idle/inactive mode UE 215 with the connected mode UE 215. For example, UE 215-a may identify an active reference signal configuration for receiving reference signal 220-a from base station 205. If the trigger condition is satisfied, UE 215-a may transmit the reference signal configuration as part of a sidelink transmission to UE 215-c via sidelink 210-a. If the trigger condition is not satisfied—for instance, if UE 215-c is not in close proximity to UE 215-a—UE 215-a may refrain from transmitting the sidelink transmission that includes the reference signal configuration. As illustrated in FIG. 2, reference signal 220-a may not be accessible to UE 215-c, e.g., due to the location of UE 215-c. UE 215-a may thus refrain from sharing a reference signal resource configuration for reference signal 220-a with UE 215-c.

In some examples, the connected mode UE 215 (e.g., UE 215-b) may be configured with multiple resources for reference signals, where individual reference signal resources each correspond to a downlink beam tracked by the UE 215. For instance, UE 215-b may be configured with resources for an active downlink beam for reference signal 220-b, as well as resources for one or more additional beams (e.g., beams adjacent to the active downlink beam). UE 215-b may selectively transmit the reference signal configuration for some or all of the configured resources. As an example, UE 215-b may transmit, and UE 215-c may receive, a configuration of reference signal resources corresponding to the active downlink beam. Alternatively, UE 215-b may transmit, and UE 215-c may receive, a configuration of a subset of reference signal resources, such as resources for the active downlink beam and one or more beams adjacent to the active downlink beam. This may be especially useful to UE 215-c if UE 215-c and UE 215-b are separated by some distance. For example, a beam adjacent to the active downlink beam may provide better performance for the UE 215-c than the active downlink beam (e.g., due to the distance between the UEs 215, a beam direction, etc.). In some other cases, UE 215-b may transmit, and UE 215-c may receive, a configuration of all reference signal resources configured to UE 215-b.

In some examples, if UE 215-b transmits multiple configurations of multiple reference signal resources for multiple beams, UE 215-b may assign an order to the resources and transmit the configurations of resources in the assigned order (e.g., in an ordered list). For instance, the reference signal resources may be ordered in the list based on a proximity of respective beams to the active downlink beam. That is, a configuration of reference signal resources for the active downlink beam may be transmitted first, followed by a configuration of reference signal resources for adjacent beams in closest proximity to the active downlink beam, further followed by reference signal resources for adjacent beams in next closest proximity to the active downlink beam, and so on for any additional reference signal resources. UE 215-c may thus prioritize using reference signal resources for beams according to the order, e.g., by first using the resources for the active downlink beam to monitor for reference signal 220-b. If the active downlink beam provides poor performance for UE 215-c (e.g., if the active downlink beam is narrow and has a beam direction that is not optimal for UE 215-c), UE 215-c may use the next reference signal resources in the list to monitor for reference signal 220-b, and so on. It should be noted that the order described herein is an example for illustrative purposes only, and other orders or assignments may be used.

In some aspects, UE 215-c may transmit a resource configuration request message to indicate that UE 215-c is requesting a resource configuration. UE 215-c may transmit the resource configuration request message to one or more other UEs 215 in the wireless communications system 200. For instance, UE 215-c may transmit a resource configuration request message directly (e.g., as a unicast transmission) to UE 215-b via sidelink 210-b. Alternatively, UE 215-c may transmit a resource configuration request message to multiple other UEs 215, such as UEs 215-a and 215-b, e.g., via a groupcast or broadcast transmission. A UE 215 receiving the resource configuration request message, such as UE 215-a or UE 215-b, may determine (e.g., according to satisfaction of a trigger condition) whether to share a resource configuration as described herein with UE 215-c, and may transmit (or refrain from transmitting) a sidelink transmission including the resource configuration to the UE 215-c accordingly.

UE 215-c may include information in the resource configuration request message for a receiving UE 215 to use in determining the proximity. For instance, UE 215-c may transmit a resource configuration request message to UE 215-a via sidelink 210-a. The resource configuration request message may include an indication of a transmit power of the resource configuration request message, physical positioning information of the UE 215-c, zone information of the UE 215-c, or other location information of the UE 215-c, or some combination thereof. UE 215-a may determine a path loss based on the transmit power indication and may use the path loss to derive a proximity of the UE 215-c to the UE 215-a. Similarly, UE 215-a may use the physical positioning information and/or the zone information to determine the proximity. UE 215-a may determine whether a trigger condition is satisfied based on the proximity. If the trigger condition is satisfied, e.g., if UE 215-c is in close proximity to UE 215-a, UE 215-a may determine to transmit the reference signal configuration to the UE 215-c. If the trigger condition is not satisfied, e.g., if UE 215-c is not in close proximity to UE 215-a, UE 215-a may refrain from transmitting the reference signal configuration. In the example of FIG. 2, UE 215-a is configured to receive reference signal 220-a. UE 215-a may determine that UE 215-c is not in close proximity and may therefore refrain from sharing the reference signal configuration for reference signal 220-a.

Additionally, or alternatively, UE 215-a may select between different resource configurations to transmit to UE 215-c, e.g., based on the proximity. Continuing the example of FIG. 2, UE 215-a may select a wide beam reference signal resource configuration (e.g., instead of a narrow beam reference signal resource configuration) to share with UE 215-c. In contrast, as UE 215-b and UE 215-c are in close proximity to one another, UE 215-b may select a narrow beam resource configuration to share with UE 215-c.

In some cases, UE 215-c may receive multiple sidelink transmissions including respective reference signal configurations from multiple connected mode UEs 215. UE 215-c may receive, for example, a reference signal configuration for reference signal 220-a from UE 215-a and a reference signal configuration for reference signal 220-b from UE 215-b. In such cases, UE 215-c may determine a proximity of the UE 215-c with each of the UEs 215-a and 215-b. UEs 215-a and 215-b may include information in the sidelink transmission that UE 215-c may use to determine the proximities, such as location information, zone information, or a transmission power of the sidelink transmission (e.g., where UE 215-*c* derives a path loss from the transmit power and determines the proximity based on the path loss). UE 215-*c* may prioritize or select a reference signal configuration from the multiple reference signal configurations based on the proximity. In the example of FIG. 2, UE 215-*c* may select the reference signal configuration corresponding to reference signal 220-*b* rather than the reference signal configuration corresponding to reference signal 220-*a*, as UE 215-*b* is closer in proximity to UE 215-*c* tha UE 215-*a*. That is, a reference signal configuration configured for a UE 215 that is closer in proximity to UE 215-*c* may be more likely to provide optimal performance than a reference signal configuration configured for a UE 215 that is farther from UE 215-*c*.

An idle/inactive mode UE 215 receiving reference signal configurations may use the reference signal configurations to monitor for and receive at least one reference signal from a base station 205. The UE 215 may use the at least one reference signal to perform one or more operations based on the type of reference signal. For instance, UE 215-*c* may receive a CSI-RS and may use the CSI-RS for downlink channel estimation, timing and frequency tracking loop updating, AGC loop updating, or serving cell RRM measurement(s). Additionally, or alternatively, UE 215-*c* may receive a PRS, and may use the PRS for downlink-based positioning.

Figure 3:
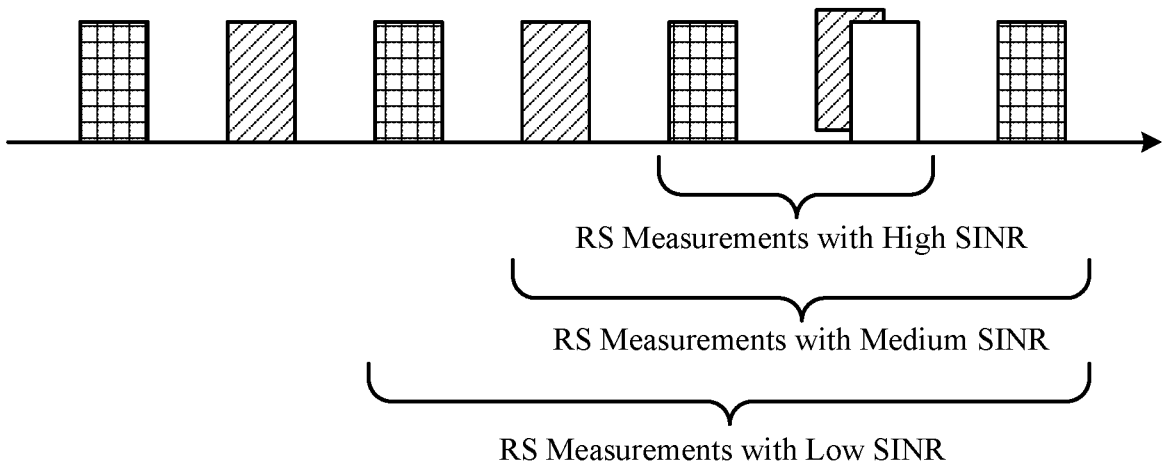
FIG. 3 illustrates an example of a transmission diagram that supports UE idle and inactive mode enhancement with sidelink in accordance with aspects of the present disclosure.
Figure 3:
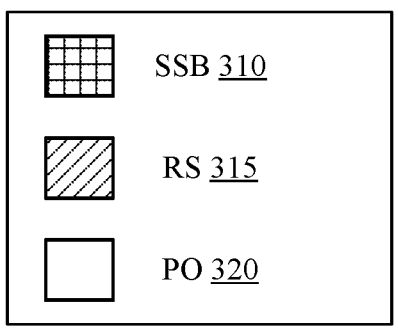

FIG. 3 illustrates an example of a transmission diagram 300 that supports UE idle and inactive mode enhancement with sidelink in accordance with aspects of the present disclosure. Transmission diagram 300 may implement aspects of wireless communications systems 100 or 200. For example, transmission diagram 300 may be an example of transmission occasions for a UE in an idle or inactive mode, such as UE 215-*c* described with reference to FIG. 2. The UE may be configured to monitor for transmissions from a base station in each corresponding occasion, where each occasion has a given periodicity. For example, as illustrated in FIG. 3, SSBs 310 and reference signals (RSs) 315 may have a 20 ms periodicity with a 10 ms offset between SSBs 310 and RSs 315. The UE may also monitor for and receive a paging message over a downlink channel during a paging occasion (PO) 320.

A UE in idle/inactive mode may be configured to periodically wake up to monitor for and receive SSBs 310 according to the configured periodicity (e.g., every 20 ms, as illustrated in FIG. 3). The UE may not be configured to receive other RSs 315, such as CSI-RSs, PRSs, or TRSs, as such RSs 315 may only be available to connected mode UEs. In comparison to other RSs 315, SSBs 310 may be transmitted with a low transmit power, a low periodicity, or in a limited bandwidth. The UE may use the SSBs 310 to perform tracking, synchronization, or other measurements or operations, for example, to obtain parameters for a downlink channel used to receive a paging message during PO 320.

However, due to the low transmit power, limited bandwidth, and/or low periodicity, the UE may not be able to perform enough measurements to find the downlink channel using a single SSB 310. That is, a UE configured only for SSBs 310 (and not RSs 315) may need to wake up and monitor for multiple SSBs 310 to obtain sufficient signal energy to monitor for a paging message during PO 320. Poor channel conditions, such as a low SNR, may increase the number of SSBs 310. A UE with limited capabilities (e.g., a REDCAP UE) may suffer further decreased performance if conditions are poor.

In the example illustrated in FIG. 3, the UE may receive an SSB 310 every 20 ms (e.g., SSBs 310 are received with a 20 ms periodicity). The UE may receive a first SSB 310 and may use the SSB 310 to perform one or more reference signal operations, such as channel measurements, used to monitor for and receive a paging message during PO 320. If the UE is unable to obtain sufficient signal energy using only the first SSB 310, the UE may wait 20 ms to receive a second SSB 310. The UE may use the second SSB 310 to continue making measurements or performing operations. If the UE is still unable to obtain sufficient signal energy after the second SSB 310, the UE may wait another 20 ms to receive a third SSB 310, and so on. Thus, the UE may take a relatively long time (e.g., as compared to a connected mode UE receiving other reference signals) to obtain channel energy and receive a paging message, which may in turn increase system overhead and decrease efficiency. In the example of FIG. 3, the UE may receive three SSBs 310, and may therefore take 60 ms to perform sufficient measurements to monitor for PO 320. Additionally, the UE wakes up to receive each SSB 310. As waking up consumes considerable power at the UE, increasing the number of SSBs 310 needed (and, thus, the number of wake up instances) may increase the power consumption. The number of SSBs 310 needed may further increase due to poor channel conditions, low transmit power, or other examples.

As described herein, to mitigate such inefficiencies and increased power consumption, the UE may receive one or more reference signal configurations from one or more connected mode UEs. The UE may use the reference signal configurations to monitor for and receive RSs 315 (e.g., in addition to receiving SSBs 310) from a base station according to a configured periodicity. Configuring the UE with additional RSs 315 may reduce the number of wakeup instances and/or a total wakeup duration. For example, the UE may wake up once to receive both an SSB 310 and an RS 315, and may be able to perform sufficient measurements to find the downlink channel within the wakeup duration. In the example of FIG. 3, the UE may receive an SSB 310 and an RS 315 every 20 ms with a 10 ms offset. Thus, the UE may perform sufficient measurements to monitor for and receive the PO 320 in 10 ms, as compared to 60 ms in the example described above. Reducing the number of wakeup instances and wakeup duration may save power at the UE and increase efficiency, as the UE may perform operations to find the downlink channel more quickly (e.g., as compared to a UE only receiving SSBs).

While poor channel conditions may increase the number of wakeup instances needed by a UE configured with both SSBs 310 and RSs 315, the total number of wakeup instances may still be fewer when compared to a UE configured with only SSBs 310. In the example of FIG. 3, if channel conditions are favorable (e.g., SINR is high), the UE may only need to receive one SSB 310 before receiving PO 320. If channel conditions decrease (e.g., SINR is relatively medium), the UE may receive three SSBs 310 and/or RSs 315 to receive PO 320. Due to the offset between the periodicities of the SSBs 310 and RSs 315, however, the total time elapsed to receive three SSBs 310 and/or RSs 315 may be reduced (e.g., from 60 ms in the example described above) to 30 ms. At low channel conditions (e.g., low SINR), the UE may receive five SSBs 310 and/or RSs 315 for a total time elapsed of 50 ms. Reducing the periodicity of RSs 315 may further reduce the total time elapsed.

Figure 4:
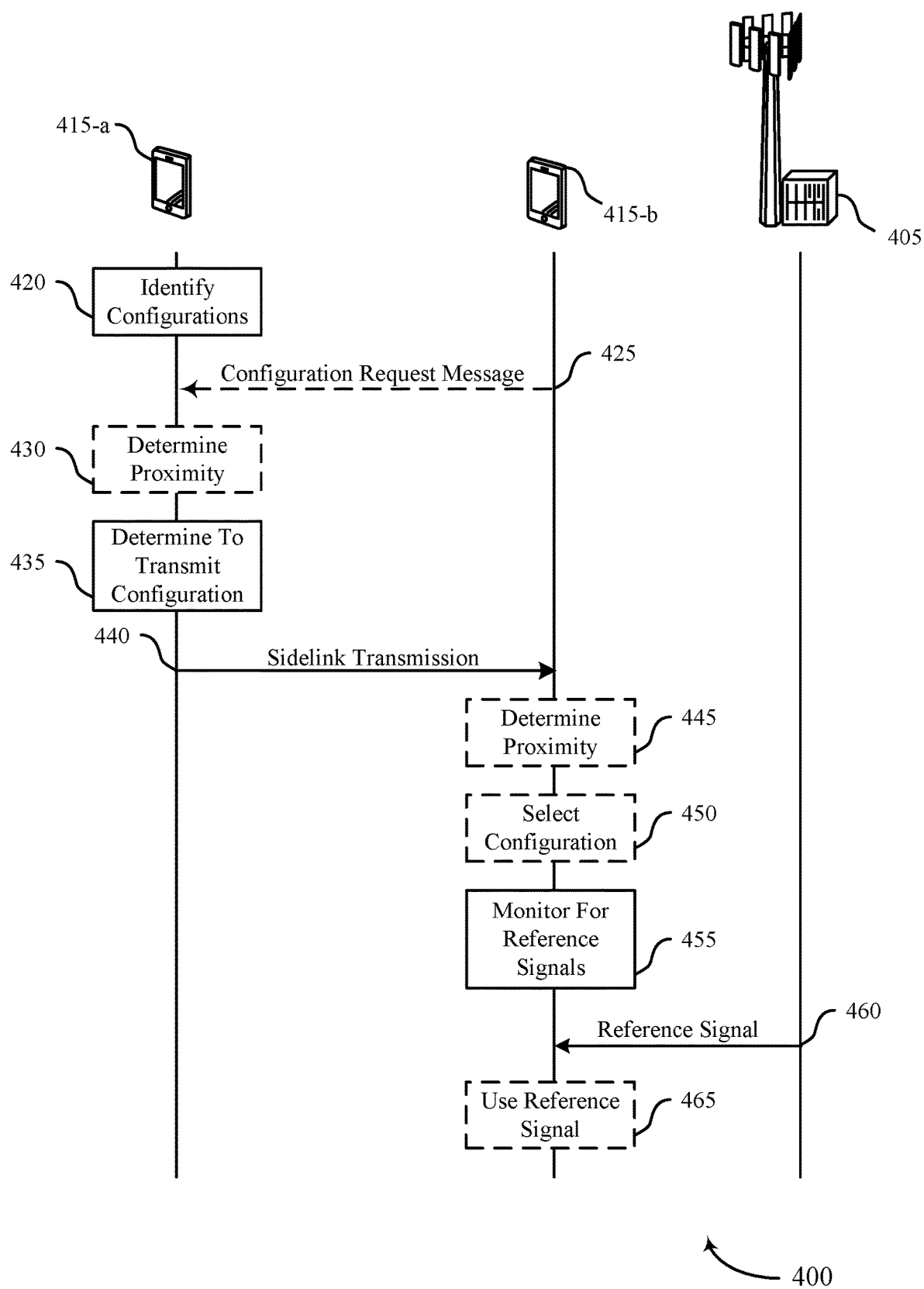
FIG. 4 illustrates an example of a process flow that supports UE idle and inactive mode enhancement with sidelink in accordance with aspects of the present disclosure.

FIG. 4 illustrates an example of a process flow 400 that supports UE idle and inactive mode enhancement with sidelink in accordance with aspects of the present disclosure.

In some examples, the process flow 400 may implement aspects of wireless communication systems 100 or 200. For example, process flow 400 may include a base station 405 and UEs 415, which may be examples of corresponding wireless devices as described herein. In the following description of the process flow 400, the operations between the UEs 415 and the base station 405 may be transmitted in a different order than the exemplary order shown, or the operations performed by the UEs 415 and the base station 405 may be performed in different orders or at different times. Certain operations may also be left out of the process flow 400, or other operations may be added to the process flow 400. It is to be understood that while the UEs 415 and the base station 405 are shown performing operations of process flow 400, any wireless device may perform the operations shown.

In the process flow 400, UE 415-a may be operating in an active or connected mode and may have an active connection (e.g., an RRC connection) with base station 405. UE 415-b may be operating in an idle or inactive mode (e.g., may not have an active connection with base station 405). UE 415-a and UE 415-b may communicate with one another via a sidelink connection. In some examples, UE 415-a and/or UE 415-b may communicate, via sidelink transmissions, with one or more additional UEs 415 (not shown). UE 415-a may be configured with one or more reference signal configurations to receive one or more reference signals from base station 405. The one or more reference signals may include, but are not limited to, a CSI-RS, a TRS, and/or a PRS.

At 420, UE 415-a may identify one or more reference signal configurations that are active at the UE 415-a. For example, UE 415-a may be configured with multiple reference signal configurations, and a subset of the reference signal configurations may be active (e.g., such that UE 415-a tracks a downlink beam used to receive the associated reference signals from base station 405).

At 425, UE 415-b may optionally transmit a reference signal configuration request message. UE 415-b may transmit the reference signal configuration request message as a sidelink transmission over a sidelink channel, for instance, as a unicast transmission, a broadcast transmission, or a groupcast transmission. UE 415-a may receive the reference signal configuration request message. In some examples, UE 415-b may transmit, as part of the reference signal configuration request message, physical positioning information of the UE 415-b, zone information of the UE 415-b, or some combination thereof. Additionally or alternatively, UE 415-b may transmit, as part of the reference signal configuration request message, an indication of a transmit power of the reference signal configuration request message.

At 430, UE 415-a may determine a proximity of the UE 415-a to UE 415-b. In some examples, UE 415-a may use the zone information, location information, or transmit power indication transmitted as part of the reference signal configuration request message at 425. For instance, UE 415-a may use the transmit power indication to derive a path loss and may determine the proximity based on the path loss.

At 435, UE 415-a may determine whether to transmit a reference signal configuration (e.g., of the one or more reference signal configurations identified at 420) to UE 415-b over a sidelink channel. The determining may be based on whether a trigger condition is satisfied. As an example, at 430, UE 415-a may determine the proximity, and at 435, UE 415-a may determine whether the trigger condition is satisfied based on the proximity. In some cases, the trigger condition may be satisfied if UE 415-b is close in proximity to UE 415-a and/or not satisfied if UE 415-b is far from UE 415-a. If, for example, UE 415-b is far from UE 415-a (e.g., the trigger condition is not satisfied), a reference signal configuration for UE 415-a may not be useful for UE 415-b (e.g., UE 415-b may not be able to access a reference signal associated with the reference signal configuration). Thus, UE 415-a may determine to refrain from transmitting the reference signal configuration to UE 415-b. Alternatively, if UE 415-b is close in proximity to UE 415-a (e.g., the trigger condition is satisfied), a reference signal configuration for UE 415-a may be used by UE 415-b to receive an associated reference signal; as such, UE 415-a may determine to transmit the reference signal configuration to UE 415-b.

In some cases, at 435, UE 415-a may also select between two or more of the reference signal configurations identified at 420. In some examples, UE 415-a may select the reference signal configuration to transmit based on the proximity determined at 430. For instance, UE 415-a may identify (e.g., at 420) a narrow beam reference signal configuration and a wide beam reference signal configuration. If, at 430, UE 415-a determines that UE 415-b is close in proximity to UE 415-a, UE 415-a may select the narrow beam reference signal configuration. Alternatively, if UE 415-a determines that UE 415-b is far from UE 415-a, UE 415-a may select the wide beam reference signal configuration (e.g., such that an associated reference signal may be received by UE 415-b despite UE 415-b being far from UE 415-a).

At 440, UE 415-a may transmit the reference signal configuration (e.g., determined at 435) to UE 415-b via a sidelink transmission over a sidelink channel. In some examples, UE 415-a may transmit the sidelink transmission including the reference signal configuration based on the trigger condition being satisfied. The sidelink transmission may be transmitted as a unicast transmission, a groupcast transmission, or a broadcast transmission. In some cases, UE 415-b may receive the sidelink transmission based on the reference signal configuration request message transmitted at 425.

The sidelink transmission that includes the reference signal configuration may include reference signal resources that UE 415-b may use to monitor for and receive a reference signal from base station 405. The reference signal resources may correspond with an active downlink beam tracked by UE 415-a. In some examples, the reference signal resources may correspond with an active downlink beam tracked by UE 415-a and with one or more beams adjacent to the active downlink beam. In some cases, the reference signal resources may be all reference signal resources that are configured to UE 415-a. The reference signal resources may be ordered based on a proximity of respective beams to the active downlink beam. For instance, UE 415-a may transmit, and UE 415-b may receive, reference signal resources in an ordered list in accordance with an order. Individual reference signal resources in the list may each correspond to a beam tracked by UE 415-a, and the order may be based on the proximity of each respective beam to the active downlink beam.

In some examples, UE 415-a may include, in the sidelink transmission, an indication of a transmit power of the sidelink transmission, physical positioning information of the UE 415-a, zone information of the UE 415-a, or some combination thereof.

In some examples, at 440, UE 415-b may receive, from one or more additional UEs 415 (not shown), one or more additional sidelink transmissions. Each additional sidelink transmission may include respective reference signal configurations for receiving reference signals from base station 405.

At 445, UE 415-b may determine a proximity of UE 415-a to UE 415-b. In some examples, UE 415-b may use the zone information, location information, or transmit power indication that was included as part of the sidelink transmission received at 440. For instance, UE 415-b may use the transmit power indication to derive a path loss and may determine the proximity based on the path loss. If UE 415-b received (e.g., at 440) additional sidelink transmissions from additional UEs 415, UE 415-b may similarly determine a proximity of UE 415-b with each of the additional UEs 415.

If, at 440, UE 415-b receives any additional sidelink transmissions from other UEs 415, UE 415-b may select, at 450, a reference signal configuration from the received reference signal configurations. In some examples, UE 415-b may select a reference signal configuration based on a proximity of UE 415-b with each UE 415 that transmitted a reference signal configuration. For instance, a UE 415 in closer proximity to UE 415-b may have a reference signal configuration for a reference signal that is more likely to be accessible to UE 415-b as compared to a UE 415 that is farther from UE 415-b. UE 415-b may thus select a reference signal configuration that was transmitted by a UE 415 that is closer in proximity to UE 415-b.

At 455, UE 415-b may use the received and/or selected reference signal configuration to monitor for one or more reference signals. In some cases, UE 415-b may use the reference signal configuration for monitoring for the one or more reference signals based on the proximity of the UE 415-b to the UE 415 that transmitted the reference signal configuration.

At 460, UE 415-b may receive at least one reference signal from base station 405 based on the monitoring performed at 455. The reference signal may include, but is not limited to, a CSI-RS, a TRS, or a PRS.

At 465, UE 415-b may optionally use the received reference signal(s) to perform one or more operations, e.g., based on the received reference signal. For example, if the received reference signal is a CSI-RS, UE 415-b may use the CSI-RS for downlink channel estimation, timing and frequency tracking loop updating, AGC loop updating, or serving cell RRM measurement, or some combination thereof. If the received reference signal is a PRS, UE 415-b may use the PRS for downlink-based positioning.

Figure 5:
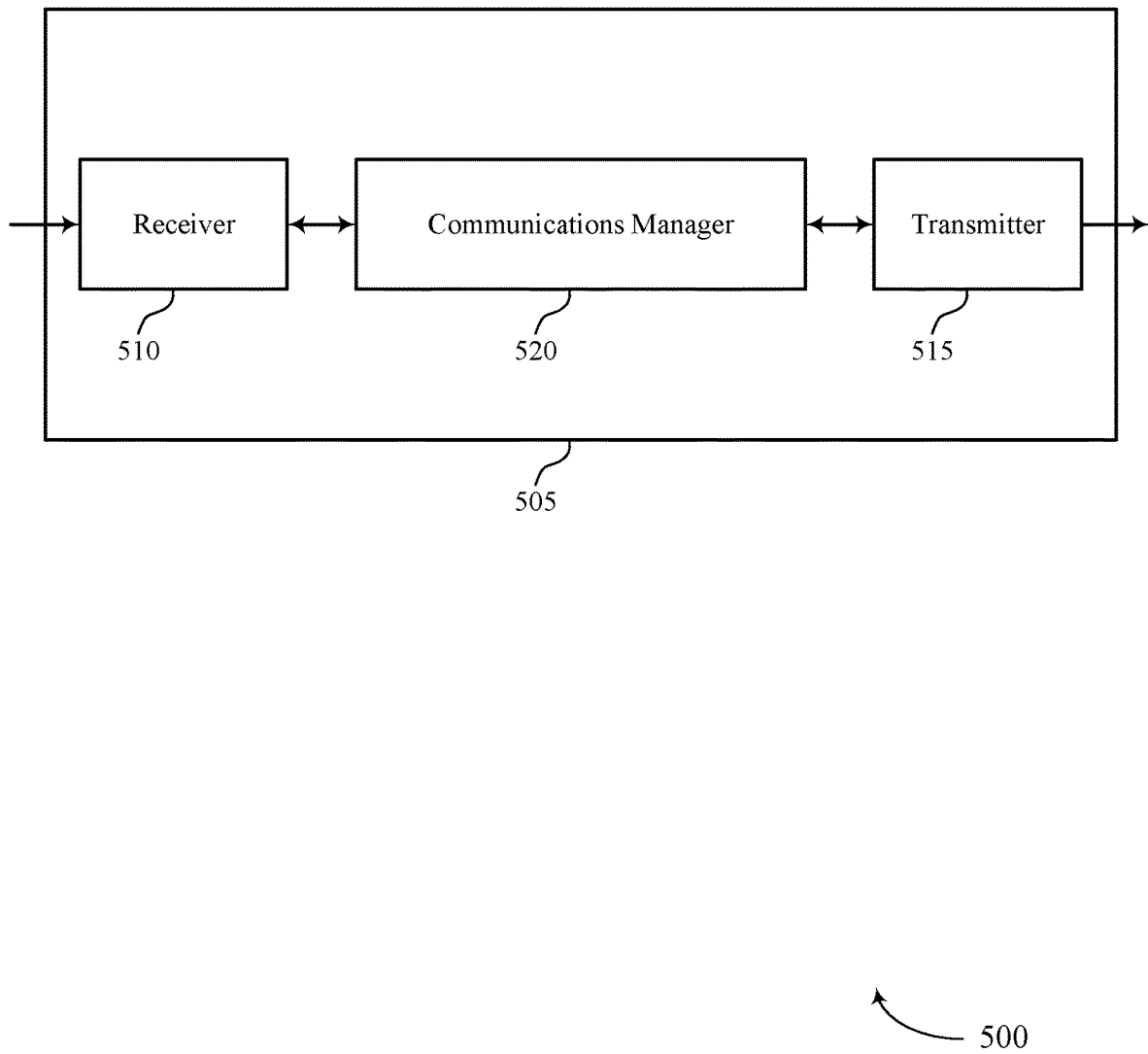
FIGS. 5 and 6 show block diagrams of devices that support UE idle and inactive mode enhancement with sidelink in accordance with aspects of the present disclosure.

FIG. 5 shows a block diagram 500 of a device 505 that supports UE idle and inactive mode enhancement with sidelink in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to UE idle and inactive mode enhancement with sidelink). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to UE idle and inactive mode enhancement with sidelink). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of UE idle and inactive mode enhancement with sidelink as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving, from a second UE and over a sidelink channel, a sidelink transmission that includes a reference signal configuration for receiving one or more reference signals from a base station. The communications manager 520 may be configured as or otherwise support a means for monitoring for the one or more reference signals based on the reference signal configuration received from the second UE. The communications manager 520 may be configured as or otherwise support a means for receiving at least one reference signal from the base station based on the monitoring.

Additionally or alternatively, the communications manager 520 may support wireless communication at a first UE in accordance with examples as disclosed herein. For example, the communications manager 520 may be configured as or otherwise support a means for identifying a reference signal configuration that is active at the first UE for receiving one or more reference signals from a base station. The communications manager 520 may be configured as or otherwise support a means for determining to transmit the reference signal configuration over a sidelink channel based on satisfaction of a trigger condition. The communications manager 520 may be configured as or otherwise support a means for transmitting the reference signal configuration via a sidelink transmission over the sidelink channel to a second UE based on the trigger condition being satisfied.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a connected mode UE sharing reference signal configurations with an idle/inactive mode UE via sidelink transmissions. A device 505 (e.g., an idle/inactive mode UE) may therefore receive additional reference signals from a base station without having an active connection with the base station. The device 505 may thus reduce an overall wakeup time and reduce the time elapsed before being able to receive a paging message from the base station, which may in turn reduce power consumption and conserve battery power at the device 505.

receiving, while in an idle/inactive mode, one or more reference signal configurations via sidelink transmissions from a connected mode UE. The device 505 may use the reference signal configuration(s) to receive, from a base station one or more reference signals that are configured for the connected mode UE without the device 505 having an active connection with the base station. The device 505 may therefore receive reference signals more frequently, which may in turn decrease the elapsed time the device 505 takes before being able to receive a paging message. Further, receiving reference signals more frequently may decrease a total wakeup time at the device 505, thereby decreasing power consumption at the device 505.

Figure 6:
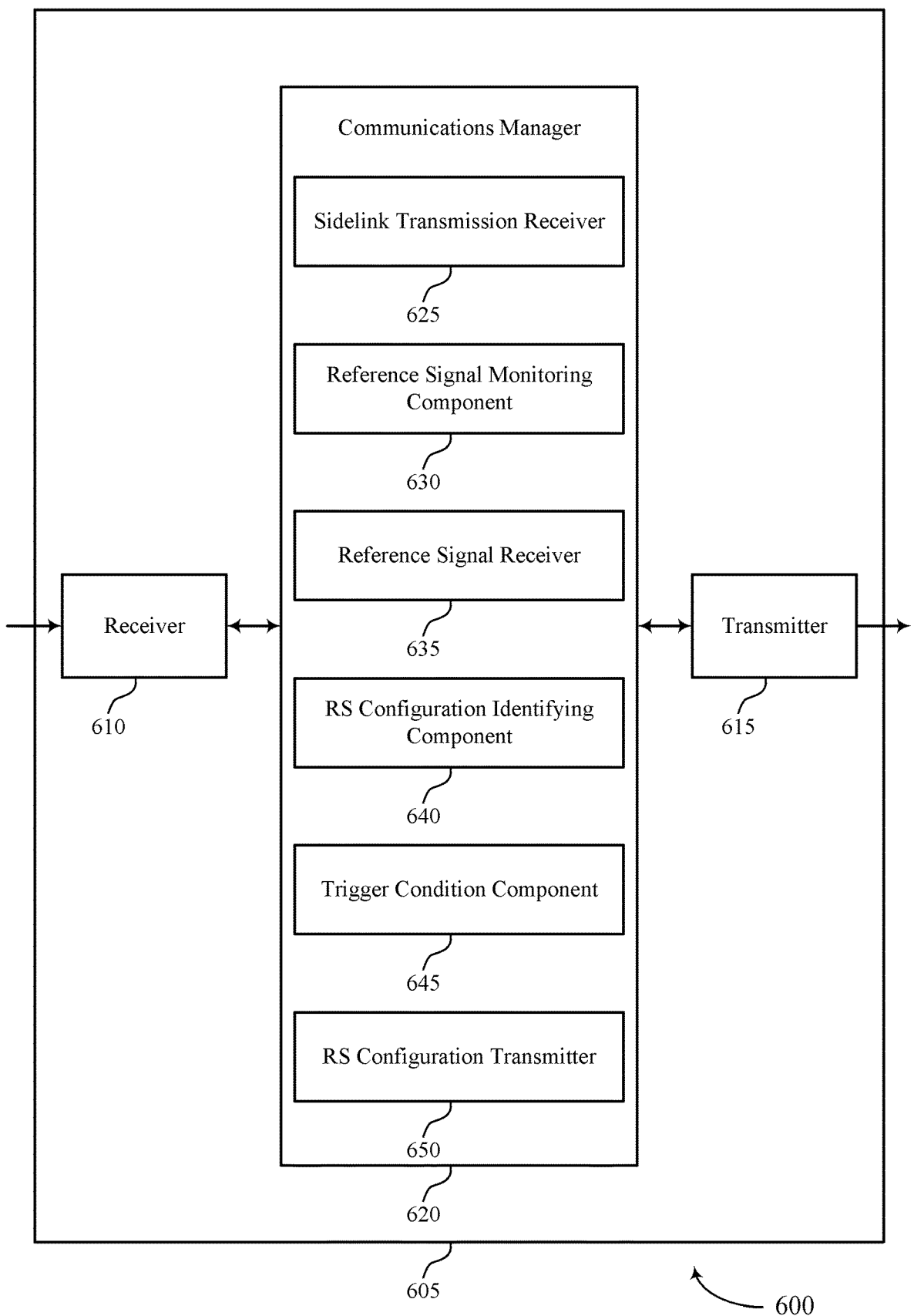

FIG. 6 shows a block diagram 600 of a device 605 that supports UE idle and inactive mode enhancement with sidelink in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to UE idle and inactive mode enhancement with sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to UE idle and inactive mode enhancement with sidelink). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of UE idle and inactive mode enhancement with sidelink as described herein. For example, the communications manager 620 may include a sidelink transmission receiver 625, a reference signal monitoring component 630, a reference signal receiver 635, an RS configuration identifying component 640, a trigger condition component 645, an RS configuration transmitter 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The sidelink transmission receiver 625 may be configured as or otherwise support a means for receiving, from a second UE and over a sidelink channel, a sidelink transmission that includes a reference signal configuration for receiving one or more reference signals from a base station. The reference signal monitoring component 630 may be configured as or otherwise support a means for monitoring for the one or more reference signals based on the reference signal configuration received from the second UE. The reference signal receiver 635 may be configured as or otherwise support a means for receiving at least one reference signal from the base station based on the monitoring.

Additionally or alternatively, the communications manager 620 may support wireless communication at a first UE in accordance with examples as disclosed herein. The RS configuration identifying component 640 may be configured as or otherwise support a means for identifying a reference signal configuration that is active at the first UE for receiving one or more reference signals from a base station. The trigger condition component 645 may be configured as or otherwise support a means for determining to transmit the reference signal configuration over a sidelink channel based on satisfaction of a trigger condition. The RS configuration transmitter 650 may be configured as or otherwise support a means for transmitting the reference signal configuration via a sidelink transmission over the sidelink channel to a second UE based on the trigger condition being satisfied.

Figure 7:
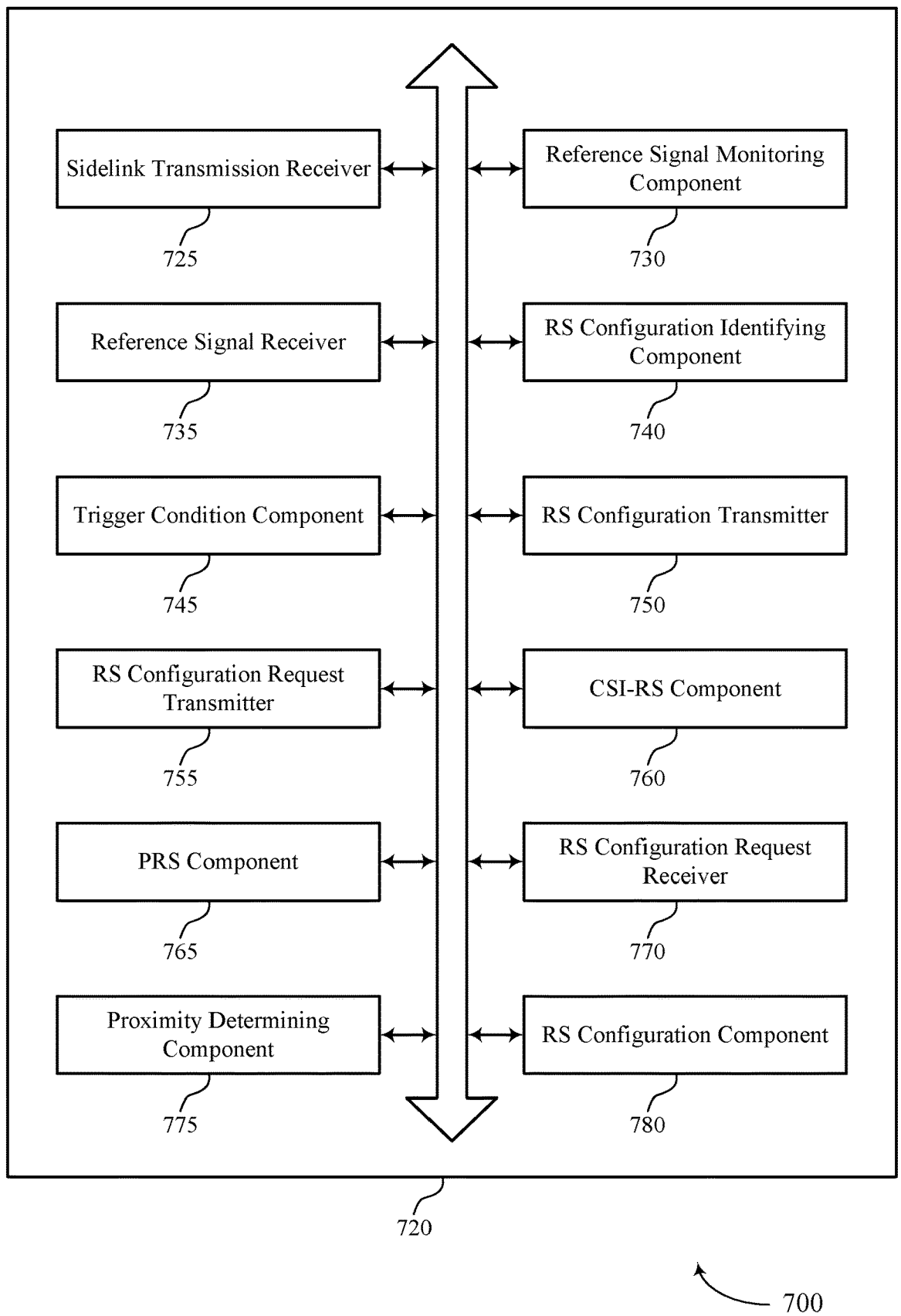
FIG. 7 shows a block diagram of a communications manager that supports UE idle and inactive mode enhancement with sidelink in accordance with aspects of the present disclosure.

FIG. 7 shows a block diagram 700 of a communications manager 720 that supports UE idle and inactive mode enhancement with sidelink in accordance with aspects of the present disclosure. The communications manager 720 may be an example of aspects of a communications manager 520, a communications manager 620, or both, as described herein. The communications manager 720, or various components thereof, may be an example of means for performing various aspects of UE idle and inactive mode enhancement with sidelink as described herein. For example, the communications manager 720 may include a sidelink transmission receiver 725, a reference signal monitoring component 730, a reference signal receiver 735, an RS configuration identifying component 740, a trigger condition component 745, an RS configuration transmitter 750, an RS configuration request transmitter 755, a CSI-RS component 760, an PRS component 765, an RS configuration request receiver 770, a proximity determining component 775, an RS configuration component 780, or any combination thereof. Each of these components may communicate, directly or indirectly, with one another (e.g., via one or more buses).

The communications manager 720 may support wireless communication at a first UE in accordance with examples as disclosed herein. The sidelink transmission receiver 725 may be configured as or otherwise support a means for receiving, from a second UE and over a sidelink channel, a sidelink transmission that includes a reference signal configuration for receiving one or more reference signals from a base station. The reference signal monitoring component 730 may be configured as or otherwise support a means for monitoring for the one or more reference signals based on the reference signal configuration received from the second UE. The reference signal receiver 735 may be configured as or otherwise support a means for receiving at least one reference signal from the base station based on the monitoring.

In some examples, to support receiving the sidelink transmission that includes the reference signal configuration, the sidelink transmission receiver 725 may be configured as or otherwise support a means for receiving reference signal resources that correspond with an active downlink beam tracked by the second UE.

In some examples, to support receiving the sidelink transmission that includes the reference signal configuration, the sidelink transmission receiver 725 may be configured as or otherwise support a means for receiving reference signal resources that correspond with an active downlink beam tracked by the second UE and with one or more beams adjacent to the active downlink beam.

In some examples, to support receiving the sidelink transmission that includes the reference signal configuration, the sidelink transmission receiver 725 may be configured as or otherwise support a means for receiving all reference signal resources configured to the second UE.

In some examples, to support receiving the sidelink transmission that includes the reference signal configuration, the sidelink transmission receiver 725 may be configured as or otherwise support a means for receiving a set of multiple reference signal resources configured to the second UE in an ordered list in accordance with an order, where individual reference signal resources of the set of multiple reference signal resources each correspond to a beam tracked by the second UE, and where the order is based on proximity of respective beams to an active downlink beam tracked by the second UE.

In some examples, to support receiving the sidelink transmission that includes the reference signal configuration, the sidelink transmission receiver 725 may be configured as or otherwise support a means for receiving, as part of the sidelink transmission, an indication of a transmit power used by the second UE for transmitting the sidelink transmission, physical positioning information of the second UE, zone information of the second UE, or some combination thereof.

In some examples, the proximity determining component 775 may be configured as or otherwise support a means for determining a proximity of the first UE to the second UE based on a determined path loss derived from the transmit power, the physical positioning information of the second UE, the zone information of the second UE, or some combination thereof. In some examples, the reference signal monitoring component 730 may be configured as or otherwise support a means for using the reference signal configuration for monitoring for the one or more reference signals based on the proximity of the first UE to the second UE.

In some examples, to support receiving the sidelink transmission that includes the reference signal configuration, the sidelink transmission receiver 725 may be configured as or otherwise support a means for receiving a set of multiple sidelink transmissions from the set of multiple UEs, each of the set of multiple sidelink transmissions including respective reference signal configurations for receiving the one or more reference signals from the base station.

In some examples, the RS configuration component 780 may be configured as or otherwise support a means for selecting the reference signal configuration from the set of multiple sidelink transmissions based on a proximity of the first UE with each of the set of multiple UEs.

In some examples, the RS configuration request transmitter 755 may be configured as or otherwise support a means for transmitting a reference signal configuration request message, where the sidelink transmission is received based on the reference signal configuration request message.

In some examples, to support transmitting the reference signal configuration request message, the RS configuration request transmitter 755 may be configured as or otherwise support a means for transmitting, as part of the reference signal configuration request message, an indication of a transmit power of the reference signal configuration request message, physical positioning information of the first UE, zone information of the first UE, or some combination thereof.

In some examples, to support transmitting the reference signal configuration request message, the RS configuration request transmitter 755 may be configured as or otherwise support a means for transmitting the reference signal configuration request message as one of a unicast transmission, a broadcast transmission, or a groupcast transmission.

In some examples, the at least one reference signal includes a CSI-RS, and the CSI-RS component 760 may be configured as or otherwise support a means for using the CSI-RS for one or more of downlink channel estimation, timing and frequency tracking updating, AGC loop updating, or serving cell RRM measurement.

In some examples, the at least one reference signal includes a PRS, and the PRS component 765 may be configured as or otherwise support a means for using the PRS for downlink-based positioning.

In some examples, to support receiving the sidelink transmission that includes the reference signal configuration, the sidelink transmission receiver 725 may be configured as or otherwise support a means for receiving the sidelink transmission over the sidelink channel via one of a unicast transmission, a groupcast transmission, or a broadcast transmission.

In some examples, the first UE is in an RRC idle mode or an inactive mode.

Additionally or alternatively, the communications manager 720 may support wireless communication at a first UE in accordance with examples as disclosed herein. The RS configuration identifying component 740 may be configured as or otherwise support a means for identifying a reference signal configuration that is active at the first UE for receiving one or more reference signals from a base station. The trigger condition component 745 may be configured as or otherwise support a means for determining to transmit the reference signal configuration over a sidelink channel based on satisfaction of a trigger condition. The RS configuration transmitter 750 may be configured as or otherwise support a means for transmitting the reference signal configuration via a sidelink transmission over the sidelink channel to a second UE based on the trigger condition being satisfied.

In some examples, to support transmitting the reference signal configuration, the RS configuration transmitter 750 may be configured as or otherwise support a means for transmitting reference signal resources that correspond with an active downlink beam tracked by the first UE.

In some examples, to support transmitting the reference signal configuration, the RS configuration transmitter 750 may be configured as or otherwise support a means for transmitting reference signal resources that correspond with an active downlink beam tracked by the first UE and with one or more beams adjacent to the active downlink beam.

In some examples, to support transmitting the reference signal configuration, the RS configuration transmitter 750 may be configured as or otherwise support a means for transmitting all reference signal resources configured to the first UE.

In some examples, to support transmitting the reference signal configuration, the RS configuration transmitter 750 may be configured as or otherwise support a means for transmitting a set of multiple reference signal resources configured to the first UE in an ordered list in accordance with an order, where individual reference signal resources of the set of multiple reference signal resources each correspond to a beam tracked by the first UE, and where the order is based on proximity of respective beams to an active downlink beam tracked by the first UE.

In some examples, the sidelink transmission includes an indication of a transmit power of the sidelink transmission, physical positioning information of the first UE, zone information of the first UE, or some combination thereof.

In some examples, the RS configuration request receiver 770 may be configured as or otherwise support a means for receiving, from the second UE, a reference signal configuration request message, where the sidelink transmission is transmitted based on the reference signal configuration request message.

In some examples, the RS configuration request receiver 770 may be configured as or otherwise support a means for receiving, as part of the reference signal configuration request message, an indication of a transmit power used by the second UE to transmit the reference signal configuration request message, physical positioning information of the second UE, zone information of the second UE, or some combination thereof. In some examples, the proximity determining component 775 may be configured as or otherwise support a means for determining a proximity of the first UE to the second UE based on a determined path loss derived from the transmit power, the physical positioning information of the second UE, the zone information of the second UE, or some combination thereof. In some examples, the trigger condition component 745 may be configured as or otherwise support a means for determining whether the trigger condition is satisfied based on the proximity.

In some examples, the RS configuration component 780 may be configured as or otherwise support a means for selecting between a narrow beam reference signal configuration and a wide beam reference signal configuration based on the proximity.

In some examples, the one or more reference signals include a CSI-RS or a positioning reference signal PRS.

In some examples, the sidelink transmission is transmitted as a unicast transmission, a broadcast transmission, or a groupcast transmission.

In some examples, the first UE is in a connected mode.

Figure 8:
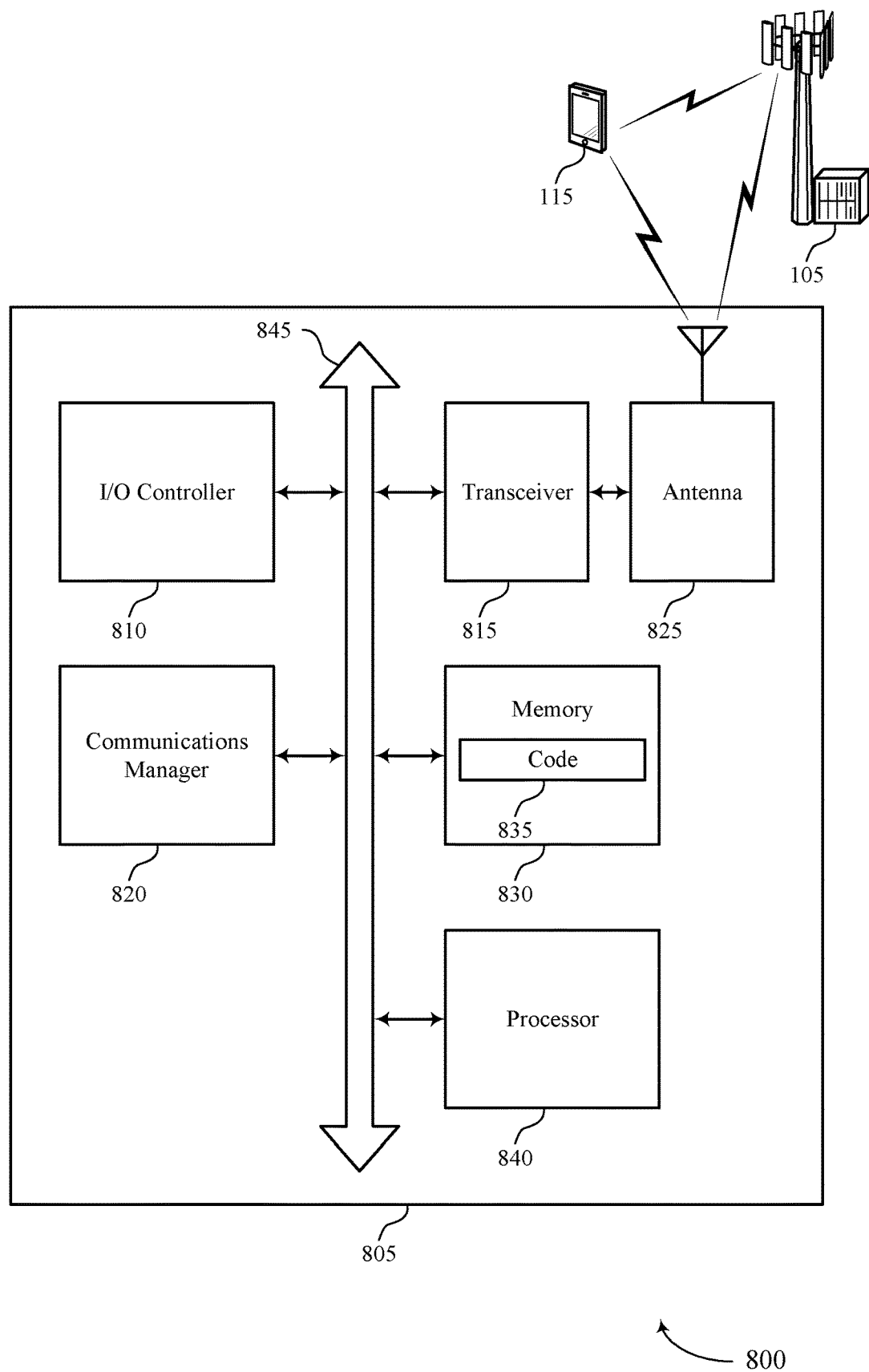
FIG. 8 shows a diagram of a system including a device that supports UE idle and inactive mode enhancement with sidelink in accordance with aspects of the present disclosure.

FIG. 8 shows a diagram of a system 800 including a device 805 that supports UE idle and inactive mode enhancement with sidelink in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting UE idle and inactive mode enhancement with sidelink). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving, from a second UE and over a sidelink channel, a sidelink transmission that includes a reference signal configuration for receiving one or more reference signals from a base station. The communications manager 820 may be configured as or otherwise support a means for monitoring for the one or more reference signals based on the reference signal configuration received from the second UE. The communications manager 820 may be configured as or otherwise support a means for receiving at least one reference signal from the base station based on the monitoring.

Additionally or alternatively, the communications manager 820 may support wireless communication at a first UE in accordance with examples as disclosed herein. For example, the communications manager 820 may be configured as or otherwise support a means for identifying a reference signal configuration that is active at the first UE for receiving one or more reference signals from a base station. The communications manager 820 may be configured as or otherwise support a means for determining to transmit the reference signal configuration over a sidelink channel based on satisfaction of a trigger condition. The communications manager 820 may be configured as or otherwise support a means for transmitting the reference signal configuration via a sidelink transmission over the sidelink channel to a second UE based on the trigger condition being satisfied.

By including or configuring the communications manager 820 in accordance with examples as described herein, the device 805 may support techniques for a connected mode UE sharing reference signal configurations with an idle/inactive mode UE via sidelink transmissions. A device 805 (e.g., an idle/inactive mode UE) may therefore receive additional reference signals from a base station without having an active connection with the base station. The device 805 may thus reduce an overall wakeup time and reduce the time elapsed before being able to receive a paging message from the base station, thereby reducing system overhead and increasing system efficiency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of UE idle and inactive mode enhancement with sidelink as described herein, or the processor 840 and the memory 830 may be otherwise configured to perform or support such operations.

Figure 9:
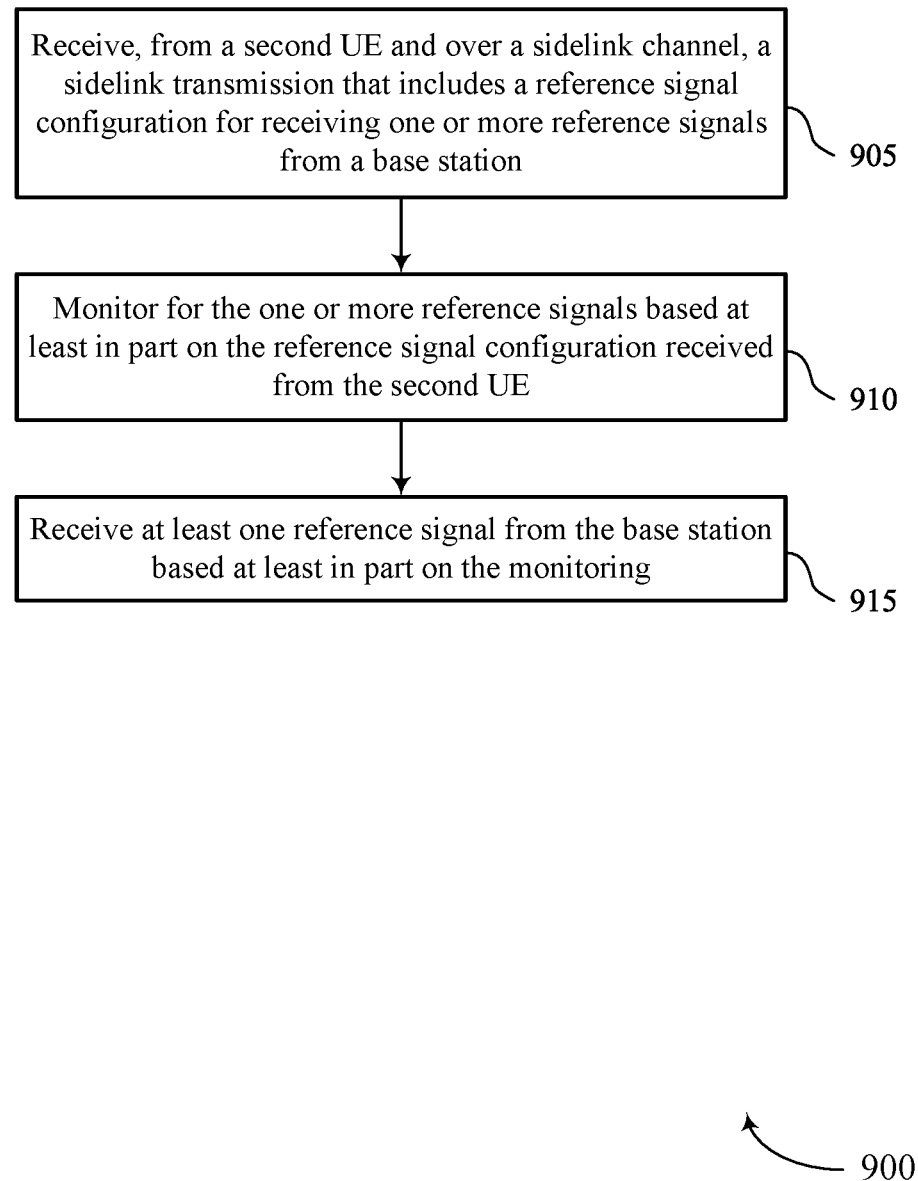
FIGS. 9 through 12 show flowcharts illustrating methods that support UE idle and inactive mode enhancement with sidelink in accordance with aspects of the present disclosure.

FIG. 9 shows a flowchart illustrating a method 900 that supports UE idle and inactive mode enhancement with sidelink in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, from a second UE and over a sidelink channel, a sidelink transmission that includes a reference signal configuration for receiving one or more reference signals from a base station. The operations of 905 may be performed in accordance with examples as disclosed herein. In some examples, aspects of the operations of 905 may be performed by a sidelink transmission receiver 725 as described with reference to FIG. 7.

At 910, the method may include monitoring for the one or more reference signals based on the reference signal configuration received from the second UE. The operations of 910 may be performed in accordance with examples as disclosed herein. In some examples, aspects of the operations of 910 may be performed by a reference signal monitoring component 730 as described with reference to FIG. 7.

At 915, the method may include receiving at least one reference signal from the base station based on the monitoring. The operations of 915 may be performed in accordance with examples as disclosed herein. In some examples, aspects of the operations of 915 may be performed by a reference signal receiver 735 as described with reference to FIG. 7.

Figure 10:
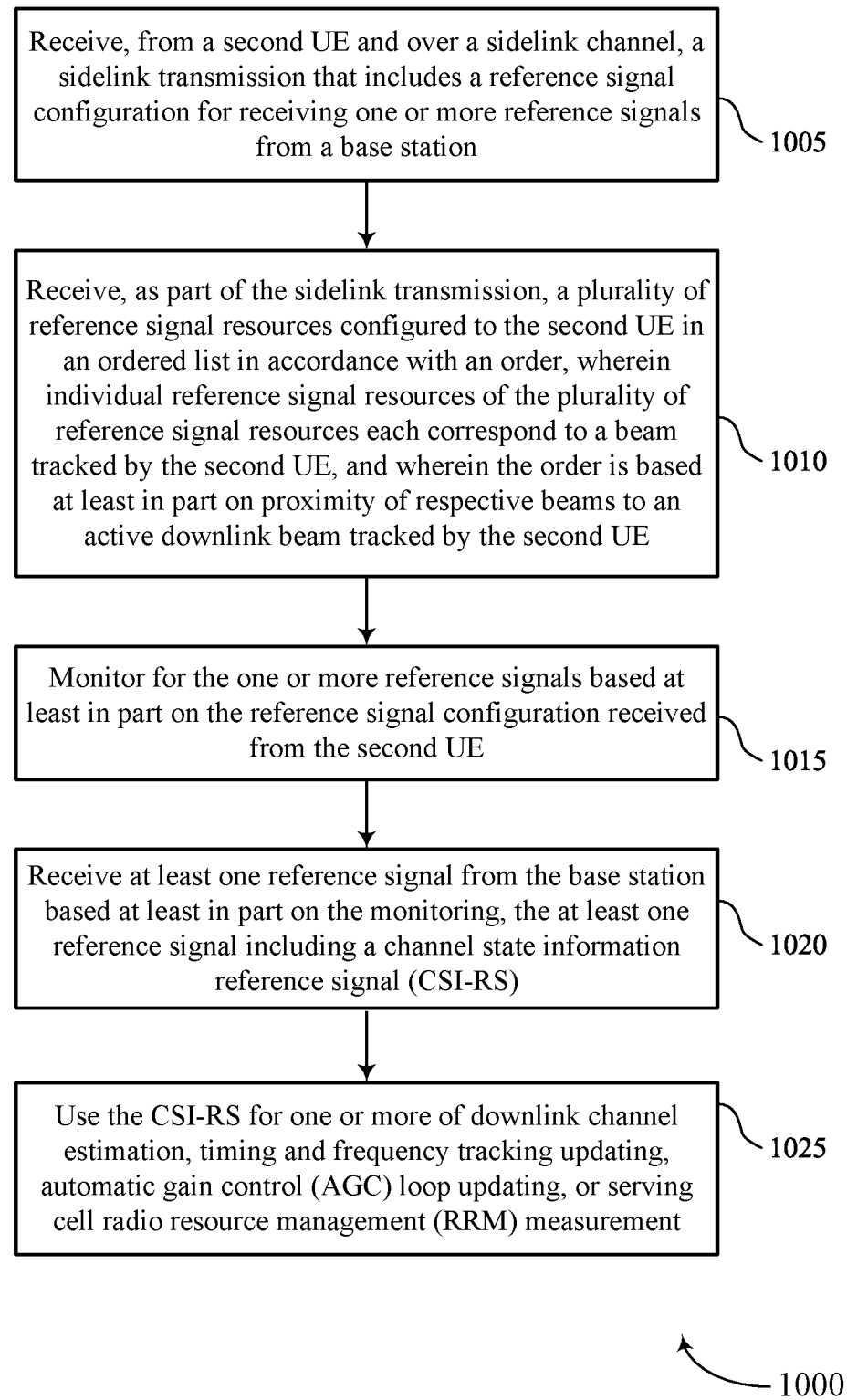

FIG. 10 shows a flowchart illustrating a method 1000 that supports UE idle and inactive mode enhancement with sidelink in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, from a second UE and over a sidelink channel, a sidelink transmission that includes a reference signal configuration for receiving one or more reference signals from a base station. The operations of 1005 may be performed in accordance with examples as disclosed herein. In some examples, aspects of the operations of 1005 may be performed by a sidelink transmission receiver 725 as described with reference to FIG. 7.

At 1010, the method may include receiving a set of multiple reference signal resources configured to the second UE in an ordered list in accordance with an order, where individual reference signal resources of the set of multiple reference signal resources each correspond to a beam tracked by the second UE, and where the order is based on proximity of respective beams to an active downlink beam tracked by the second UE. The operations of 1010 may be performed in accordance with examples as disclosed herein. In some examples, aspects of the operations of 1010 may be performed by a sidelink transmission receiver 725 as described with reference to FIG. 7.

At 1015, the method may include monitoring for the one or more reference signals based on the reference signal configuration received from the second UE. The operations of 1015 may be performed in accordance with examples as disclosed herein. In some examples, aspects of the operations of 1015 may be performed by a reference signal monitoring component 730 as described with reference to FIG. 7.

At 1020, the method may include receiving at least one reference signal from the base station based on the monitoring. The operations of 1020 may be performed in accordance with examples as disclosed herein. In some examples, aspects of the operations of 1020 may be performed by a reference signal receiver 735 as described with reference to FIG. 7.

At 1025, the method may include using the CSI-RS for one or more of downlink channel estimation, timing and frequency tracking updating, automatic gain control (AGC) loop updating, or serving cell radio resource management (RRM) measurement. The operations of 1025 may be performed in accordance with examples as disclosed herein. In some examples, aspects of the operations of 1025 may be performed by a CSI-RS component 760 as described with reference to FIG. 7.

Figure 11:
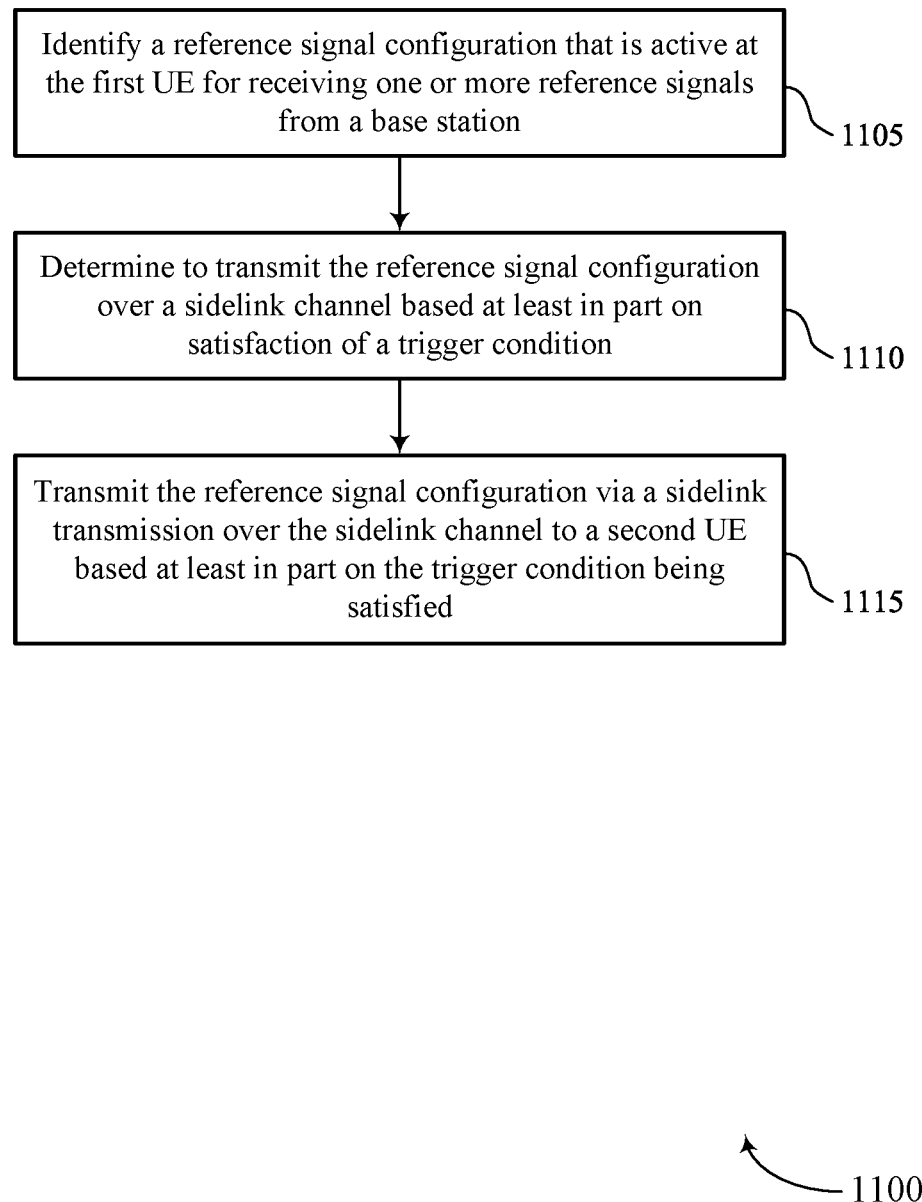

FIG. 11 shows a flowchart illustrating a method 1100 that supports UE idle and inactive mode enhancement with sidelink in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include identifying a reference signal configuration that is active at the first UE for receiving one or more reference signals from a base station. The operations of 1105 may be performed in accordance with examples as disclosed herein. In some examples, aspects of the operations of 1105 may be performed by an RS configuration identifying component 740 as described with reference to FIG. 7.

At 1110, the method may include determining to transmit the reference signal configuration over a sidelink channel based on satisfaction of a trigger condition. The operations of 1110 may be performed in accordance with examples as disclosed herein. In some examples, aspects of the operations of 1110 may be performed by a trigger condition component 745 as described with reference to FIG. 7.

At 1115, the method may include transmitting the reference signal configuration via a sidelink transmission over the sidelink channel to a second UE based on the trigger condition being satisfied. The operations of 1115 may be performed in accordance with examples as disclosed herein. In some examples, aspects of the operations of 1115 may be performed by an RS configuration transmitter 750 as described with reference to FIG. 7.

Figure 12:
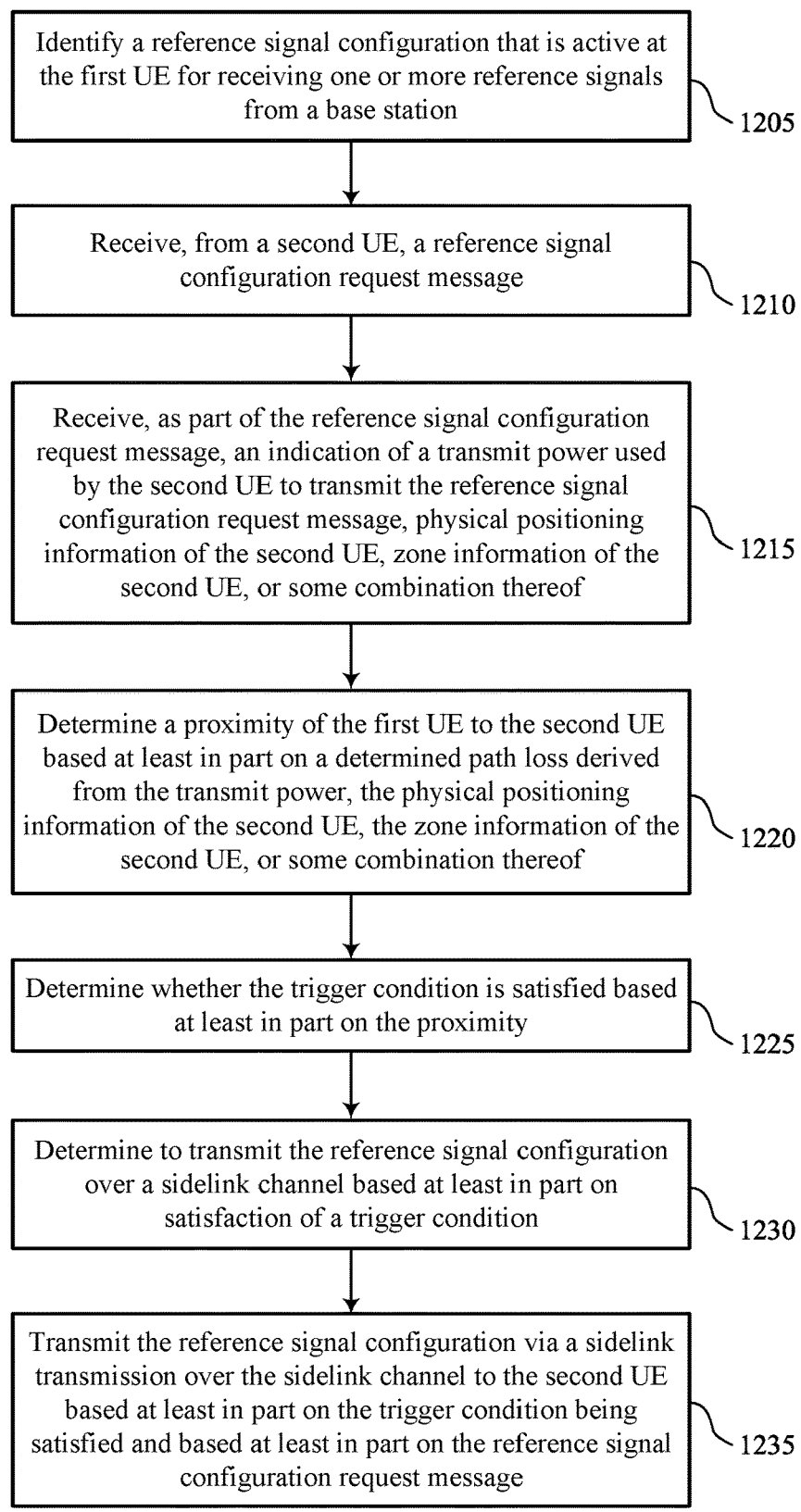

FIG. 12 shows a flowchart illustrating a method 1200 that supports UE idle and inactive mode enhancement with sidelink in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include identifying a reference signal configuration that is active at the first UE for receiving one or more reference signals from a base station. The operations of 1205 may be performed in accordance with examples as disclosed herein. In some examples, aspects of the operations of 1205 may be performed by an RS configuration identifying component 740 as described with reference to FIG. 7.

At 1210, the method may include receiving, from the second UE, a reference signal configuration request message, where the sidelink transmission is transmitted based on the reference signal configuration request message. The operations of 1210 may be performed in accordance with examples as disclosed herein. In some examples, aspects of the operations of 1210 may be performed by an RS configuration request receiver 770 as described with reference to FIG. 7.

At 1215, the method may include receiving, as part of the reference signal configuration request message, an indication of a transmit power used by the second UE to transmit the reference signal configuration request message, physical positioning information of the second UE, zone information of the second UE, or some combination thereof. The operations of 1215 may be performed in accordance with examples as disclosed herein. In some examples, aspects of the operations of 1215 may be performed by an RS configuration request receiver 770 as described with reference to FIG. 7.

At 1220, the method may include determining a proximity of the first UE to the second UE based on a determined path loss derived from the transmit power, the physical positioning information of the second UE, the zone information of the second UE, or some combination thereof. The operations of 1220 may be performed in accordance with examples as disclosed herein. In some examples, aspects of the operations of 1220 may be performed by a proximity determining component 775 as described with reference to FIG. 7.

At 1225, the method may include determining whether the trigger condition is satisfied based on the proximity. The operations of 1225 may be performed in accordance with examples as disclosed herein. In some examples, aspects of the operations of 1225 may be performed by a trigger condition component 745 as described with reference to FIG. 7.

At 1230, the method may include determining to transmit the reference signal configuration over a sidelink channel based on satisfaction of a trigger condition. The operations of 1230 may be performed in accordance with examples as disclosed herein. In some examples, aspects of the operations of 1230 may be performed by a trigger condition component 745 as described with reference to FIG. 7.

At 1235, the method may include transmitting the reference signal configuration via a sidelink transmission over the sidelink channel to a second UE based on the trigger condition being satisfied. The operations of 1235 may be performed in accordance with examples as disclosed herein. In some examples, aspects of the operations of 1235 may be performed by an RS configuration transmitter 750 as described with reference to FIG. 7.

The following provides an overview of aspects of the present disclosure:

Aspect 1: A method for wireless communication at a first UE, comprising: receiving, from a second UE and over a sidelink channel, a sidelink transmission that includes a reference signal configuration for receiving one or more reference signals from a base station; monitoring for the one or more reference signals based at least in part on the reference signal configuration received from the second UE; and receiving at least one reference signal from the base station based at least in part on the monitoring.

Aspect 2: The method of aspect 1, wherein receiving the sidelink transmission that includes the reference signal configuration comprises: receiving reference signal resources that correspond with an active downlink beam tracked by the second UE.

Aspect 3: The method of any of aspects 1 through 2, wherein receiving the sidelink transmission that includes the reference signal configuration comprises: receiving reference signal resources that correspond with an active downlink beam tracked by the second UE and with one or more beams adjacent to the active downlink beam.

Aspect 4: The method of any of aspects 1 through 3, wherein receiving the sidelink transmission that includes the reference signal configuration comprises: receiving all reference signal resources configured to the second UE.

Aspect 5: The method of any of aspects 1 through 4, wherein receiving the sidelink transmission that includes the reference signal configuration comprises: receiving a plurality of reference signal resources configured to the second UE in an ordered list in accordance with an order, wherein individual reference signal resources of the plurality of reference signal resources each correspond to a beam tracked by the second UE, and wherein the order is based at least in part on proximity of respective beams to an active downlink beam tracked by the second UE.

Aspect 6: The method of any of aspects 1 through 5, wherein receiving the sidelink transmission that includes the reference signal configuration comprises: receiving, as part of the sidelink transmission, an indication of a transmit power used by the second UE for transmitting the sidelink transmission, physical positioning information of the second UE, zone information of the second UE, or some combination thereof.

Aspect 7: The method of aspect 6, further comprising: determining a proximity of the first UE to the second UE based at least in part on a determined path loss derived from the transmit power, the physical positioning information of the second UE, the zone information of the second UE, or some combination thereof; and using the reference signal configuration for monitoring for the one or more reference signals based at least in part on the proximity of the first UE to the second UE.

Aspect 8: The method of any of aspects 1 through 7, wherein the second UE is one of a plurality of UEs, and wherein receiving the sidelink transmission that includes the reference signal configuration comprises: receiving a plurality of sidelink transmissions from the plurality of UEs, each of the plurality of sidelink transmissions comprising respective reference signal configurations for receiving the one or more reference signals from the base station.

Aspect 9: The method of aspect 8, further comprising: selecting the reference signal configuration from the plurality of sidelink transmissions based at least in part on a proximity of the first UE with each of the plurality of UEs.

Aspect 10: The method of any of aspects 1 through 9, further comprising: transmitting a reference signal configuration request message, wherein the sidelink transmission is received based at least in part on the reference signal configuration request message.

Aspect 11: The method of aspect 10, wherein transmitting the reference signal configuration request message comprises: transmitting, as part of the reference signal configuration request message, an indication of a transmit power of the reference signal configuration request message, physical positioning information of the first UE, zone information of the first UE, or some combination thereof.

Aspect 12: The method of any of aspects 10 through 11, wherein transmitting the reference signal configuration request message comprises: transmitting the reference signal configuration request message as one of a unicast transmission, a broadcast transmission, or a groupcast transmission.

Aspect 13: The method of any of aspects 1 through 12, wherein the at least one reference signal comprises a CSI-RS, the method further comprising: using the CSI-RS for one or more of downlink channel estimation, timing and frequency tracking updating, AGC loop updating, or serving cell RRM measurement.

Aspect 14: The method of any of aspects 1 through 13, wherein the at least one reference signal comprises a PRS, the method further comprising: using the PRS for downlink-based positioning.

Aspect 15: The method of any of aspects 1 through 14, wherein receiving the sidelink transmission that includes the reference signal configuration comprises: receiving the sidelink transmission over the sidelink channel via one of a unicast transmission, a groupcast transmission, or a broadcast transmission.

Aspect 16: The method of any of aspects 1 through 15, wherein the first UE is in an RRC idle mode or an inactive mode.

Aspect 17: A method for wireless communication at a first UE, comprising: identifying a reference signal configuration that is active at the first UE for receiving one or more reference signals from a base station; determining to transmit the reference signal configuration over a sidelink channel based at least in part on satisfaction of a trigger condition; and transmitting the reference signal configuration via a sidelink transmission over the sidelink channel to a second UE based at least in part on the trigger condition being satisfied.

Aspect 18: The method of aspect 17, wherein transmitting the reference signal configuration comprises: transmitting reference signal resources that correspond with an active downlink beam tracked by the first UE.

Aspect 19: The method of any of aspects 17 through 18, wherein transmitting the reference signal configuration comprises: transmitting reference signal resources that correspond with an active downlink beam tracked by the first UE and with one or more beams adjacent to the active downlink beam.

Aspect 20: The method of any of aspects 17 through 19, wherein transmitting the reference signal configuration comprises: transmitting all reference signal resources configured to the first UE.

Aspect 21: The method of any of aspects 17 through 20, wherein transmitting the reference signal configuration comprises: transmitting a plurality of reference signal resources configured to the first UE in an ordered list in accordance with an order, wherein individual reference signal resources of the plurality of reference signal resources each correspond to a beam tracked by the first UE, and wherein the order is based at least in part on proximity of respective beams to an active downlink beam tracked by the first UE.

Aspect 22: The method of any of aspects 17 through 21, wherein the sidelink transmission includes an indication of a transmit power of the sidelink transmission, physical positioning information of the first UE, zone information of the first UE, or some combination thereof.

Aspect 23: The method of any of aspects 17 through 22, further comprising: receiving, from the second UE, a reference signal configuration request message, wherein the sidelink transmission is transmitted based at least in part on the reference signal configuration request message.

Aspect 24: The method of aspect 23, further comprising: receiving, as part of the reference signal configuration request message, an indication of a transmit power used by the second UE to transmit the reference signal configuration request message, physical positioning information of the second UE, zone information of the second UE, or some combination thereof determining a proximity of the first UE to the second UE based at least in part on a determined path loss derived from the transmit power, the physical positioning information of the second UE, the zone information of the second UE, or some combination thereof and determining whether the trigger condition is satisfied based at least in part on the proximity.

Aspect 25: The method of aspect 24, further comprising: selecting between a narrow beam reference signal configuration and a wide beam reference signal configuration based at least in part on the proximity.

Aspect 26: The method of any of aspects 17 through 25, wherein the one or more reference signals comprise a CSI-RS or a PRS.

Aspect 27: The method of any of aspects 17 through 26, wherein the sidelink transmission is transmitted as a unicast transmission, a broadcast transmission, or a groupcast transmission.

Aspect 28: The method of any of aspects 17 through 27, wherein the first UE is in a connected mode.

Aspect 29: An apparatus for wireless communication at a first UE, comprising a processor; memory coupled with the processor; and instructions stored in the memory and executable by the processor to cause the apparatus to perform a method of any of aspects 1 through 16.

Aspect 30: An apparatus for wireless communication at a first UE, comprising at least one means for performing a method of any of aspects 1 through 16.

Aspect 31: A non-transitory computer-readable medium storing code for wireless communication at a first UE, the code comprising instructions executable by a processor to perform a method of any of aspects 1 through 16.

Aspect 32: An apparatus for wireless communication at a first UE, comprising a processor; memory coupled with the processor; and instructions stored in the memory and executable by the processor to cause the apparatus to perform a method of any of aspects 17 through 28.

Aspect 33: An apparatus for wireless communication at a first UE, comprising at least one means for performing a method of any of aspects 17 through 28.

Aspect 34: A non-transitory computer-readable medium storing code for wireless communication at a first UE, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
    transmitting, to a second UE, a reference signal configuration request message, wherein the first UE is in a radio resource control (RRC) idle mode or a RRC inactive mode, and the second UE is in a RRC connected mode;
    receiving, from the second UE via a sidelink channel and in response to the reference signal configuration request message, a sidelink transmission that includes a reference signal configuration for receiving one or more reference signals from a network device, wherein the reference signal configuration indicates one or more downlink resources for receiving the one or more reference signals, and wherein the one or more reference signals include one among a channel state information reference signal (CSI-RS), a positioning reference signal (PRS), and a tracking reference signal (TRS);
    monitoring, at the first UE, the one or more downlink resources for the one or more reference signals from the network device based at least in part on the reference signal configuration received from the second UE; and
    receiving, at the first UE, at least one reference signal from the network device via the one or more downlink resources based at least in part on the monitoring.

2. The method of claim 1, wherein receiving the sidelink transmission that includes the reference signal configuration comprises:
    receiving reference signal resources that correspond with an active downlink beam tracked by the second UE.

3. The method of claim 1, wherein receiving the sidelink transmission that includes the reference signal configuration comprises:
    receiving reference signal resources that correspond with an active downlink beam tracked by the second UE and with one or more beams adjacent to the active downlink beam.

4. The method of claim 1, wherein receiving the sidelink transmission that includes the reference signal configuration comprises:
    receiving all reference signal resources configured to the second UE.

5. The method of claim 1, wherein receiving the sidelink transmission that includes the reference signal configuration comprises:
    receiving a plurality of reference signal resources configured to the second UE in an ordered list in accordance with an order, wherein individual reference signal resources of the plurality of reference signal resources each correspond to a beam tracked by the second UE, and wherein the order is based at least in part on proximity of respective beams to an active downlink beam tracked by the second UE.

6. The method of claim 1, wherein receiving the sidelink transmission that includes the reference signal configuration comprises:
    receiving, as part of the sidelink transmission, an indication of a transmit power used by the second UE for transmitting the sidelink transmission, physical positioning information of the second UE, zone information of the second UE, or some combination thereof.

7. The method of claim 6, further comprising:
determining a proximity of the first UE to the second UE based at least in part on a determined path loss derived from the transmit power, the physical positioning information of the second UE, the zone information of the second UE, or some combination thereof; and
using the reference signal configuration for monitoring the one or more downlink resources for the one or more reference signals based at least in part on the proximity of the first UE to the second UE.

8. The method of claim 1, wherein the second UE is one of a plurality of UEs, and wherein receiving the sidelink transmission that includes the reference signal configuration comprises:
receiving a plurality of sidelink transmissions from the plurality of UEs, each of the plurality of sidelink transmissions comprising respective reference signal configurations for receiving the one or more reference signals from the network device.

9. The method of claim 8, further comprising:
selecting the reference signal configuration from the plurality of sidelink transmissions based at least in part on a proximity of the first UE with each of the plurality of UEs.

10. The method of claim 1, wherein transmitting the reference signal configuration request message comprises:
transmitting, as part of the reference signal configuration request message, an indication of a transmit power of the reference signal configuration request message, physical positioning information of the first UE, zone information of the first UE, or some combination thereof.

11. The method of claim 1, wherein transmitting the reference signal configuration request message comprises:
transmitting the reference signal configuration request message as one of a unicast transmission, a broadcast transmission, or a groupcast transmission.

12. The method of claim 1, wherein the at least one reference signal comprises the CSI-RS, the method further comprising:
using the CSI-RS for one or more of downlink channel estimation, timing and frequency tracking updating, automatic gain control (AGC) loop updating, or serving cell radio resource management (RRM) measurement.

13. The method of claim 1, wherein the at least one reference signal comprises the PRS, the method further comprising:
using the PRS for downlink-based positioning.

14. The method of claim 1, wherein receiving the sidelink transmission that includes the reference signal configuration comprises:
receiving the sidelink transmission over the sidelink channel via one of a unicast transmission, a groupcast transmission, or a broadcast transmission.

15. An apparatus for wireless communication at a first user equipment (UE), comprising:
one or more processors;
one or more memories coupled with the one or more processors; and
instructions stored in the one or more memories and executable by the one or more processors to cause the apparatus to:
transmit, to a second UE, a reference signal configuration request message, wherein the first UE is in a radio resource control (RRC) idle mode or a RRC inactive mode, and the second UE is in a RRC connected mode;
receive, from the second UE via a sidelink channel and in response to the reference signal configuration request message, a sidelink transmission that includes a reference signal configuration for receiving one or more reference signals from a network device, wherein the reference signal configuration indicates one or more downlink resources for receiving the one or more reference signals, and wherein the one or more reference signals include one among a channel state information reference signal (CSI-RS), a positioning reference signal (PRS), and a tracking reference signal (TRS);
monitor, at the first UE, the one or more downlink resources for the one or more reference signals from the network device based at least in part on the reference signal configuration received from the second UE; and
receive, at the first UE, at least one reference signal from the network device via the one or more downlink resources based at least in part on the monitoring.

16. The apparatus of claim 15, wherein the one or more processors, to receive the sidelink transmission that includes the reference signal configuration, are configured to cause the apparatus to:
receive reference signal resources that correspond with an active downlink beam tracked by the second UE.

17. The apparatus of claim 15, wherein the one or more processors, to receive the sidelink transmission that includes the reference signal configuration, are configured to cause the apparatus to:
receive, as part of the sidelink transmission, an indication of a transmit power used by the second UE for transmitting the sidelink transmission, physical positioning information of the second UE, zone information of the second UE, or some combination thereof.

18. The apparatus of claim 15, wherein the one or more processors are configured to cause the apparatus to:
select the reference signal configuration from a plurality of reference signal configurations corresponding to a plurality of sidelink transmissions based at least in part on a proximity of the first UE with each of a plurality of UEs associated with the plurality of sidelink transmissions.

19. The apparatus of claim 15, wherein the one or more processors, to receive the sidelink transmission that includes the reference signal configuration, is configured to cause the apparatus to:
receive the sidelink transmission over the sidelink channel via one of a unicast transmission, a groupcast transmission, or a broadcast transmission.

* * * * *